United States Patent
Zhou et al.

(10) Patent No.: US 12,010,016 B2
(45) Date of Patent: Jun. 11, 2024

(54) DATA STREAM TRANSMISSION METHOD AND DEVICE

(71) Applicant: HUAWEI TECHNOLOGIES CO., LTD., Guangdong (CN)

(72) Inventors: Jun Zhou, Nanjing (CN); Naiqiang Qiao, Nanjing (CN); Qi Bu, Nanjing (CN); Qing Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 17/489,756

(22) Filed: Sep. 29, 2021

(65) Prior Publication Data
US 2022/0021612 A1 Jan. 20, 2022

Related U.S. Application Data

(63) Continuation of application No. PCT/CN2020/083713, filed on Apr. 8, 2020.

(30) Foreign Application Priority Data

Apr. 8, 2019 (CN) .......................... 201910277087.X

(51) Int. Cl.
*H04L 45/00* (2022.01)
*H04L 43/0829* (2022.01)
(Continued)

(52) U.S. Cl.
CPC .......... *H04L 45/70* (2013.01); *H04L 43/0829* (2013.01); *H04L 43/0852* (2013.01); *H04L 43/0876* (2013.01)

(58) Field of Classification Search
None
See application file for complete search history.

(56) References Cited

U.S. PATENT DOCUMENTS

| 8,819,520 B1 | 8/2014 | Slavetsky |
| 9,572,198 B1 * | 2/2017 | Shah ..................... H04W 92/02 |

(Continued)

FOREIGN PATENT DOCUMENTS

| CN | 101039260 A | 9/2007 |
| CN | 101505202 A | 8/2009 |

(Continued)

OTHER PUBLICATIONS

Tong Gan et al, Expected Run-Time Distortion Based Scheduling for Scalable Video Transmission With Hybrid FEC/ARQ Error Control, 2007 IEEE International Conference on Acoustics, Speech and Signal Processing—ICASSP ''07, Jun. 4, 2007, 4 pages.

(Continued)

*Primary Examiner* — Yaotang Wang
(74) *Attorney, Agent, or Firm* — HUAWEI TECHNOLOGIES CO., LTD.

(57) ABSTRACT

Embodiments of this application provide a data stream transmission method. The method includes a sending device that dynamically determines a packet-loss-concealment policy based on first path status information of a path used to send a data stream. The sending device generates a packet-loss-concealment packet for the data stream according to the packet-loss-concealment policy. The sending device sends the data stream on the path. The data stream includes an original packet and the packet-loss-concealment packet. Therefore, when receiving the data stream, a receiving device decodes the data stream according to the packet-loss-concealment policy received from the sending device, and recovers, by using the packet-loss-concealment packet, an original packet lost in a transmission process. This effectively improves a packet loss recovery effect, and improves user experience.

17 Claims, 18 Drawing Sheets

(51) Int. Cl.
*H04L 43/0852* (2022.01)
*H04L 43/0876* (2022.01)

(56) References Cited

U.S. PATENT DOCUMENTS

| | | | |
|---|---|---|---|
| 9,973,215 B1* | 5/2018 | Sivakumar | H03M 13/353 |
| 2008/0022181 A1 | 1/2008 | Belogolovy et al. | |
| 2012/0131408 A1 | 5/2012 | Tada et al. | |
| 2013/0117638 A1 | 5/2013 | Yang et al. | |
| 2015/0117468 A1 | 4/2015 | Shin et al. | |
| 2016/0218979 A1* | 7/2016 | Roh | H04L 47/122 |
| 2016/0277548 A1 | 9/2016 | Ozawa | |
| 2019/0215385 A1* | 7/2019 | Ethier | H04L 45/123 |
| 2021/0029189 A1* | 1/2021 | Wang | G10L 19/22 |

FOREIGN PATENT DOCUMENTS

| | | |
|---|---|---|
| CN | 1976269 B | 8/2010 |
| CN | 102325009 A | 1/2012 |
| CN | 102438002 A | 5/2012 |
| CN | 102638331 A | 8/2012 |
| CN | 102790666 A | 11/2012 |
| CN | 105517028 A | 4/2016 |
| CN | 107395522 A | 11/2017 |
| CN | 107682886 A | 2/2018 |
| CN | 108075859 A | 5/2018 |
| CN | 108075861 A | 5/2018 |
| JP | S5452908 A | 4/1979 |
| JP | H0723026 A | 1/1995 |
| JP | 2002064506 A | 2/2002 |
| JP | 2005102157 A | 4/2005 |
| WO | 2007061087 A1 | 5/2007 |
| WO | 2014129044 A1 | 8/2014 |

OTHER PUBLICATIONS

ITU-T H.248.1 Amendment 2(Dec. 2009), Series H: Audiovisual and Multimedia SystemsInfrastructure of audiovisual services—Communication procedures, Gateway control protocol: Version 3, Amendment 2: New Appendix IV, plus corrections and clarifications, total 64 pages.

M.V.Sreeeaj et al.,"Hybrid AdaPtive Loss Recovery and Enhanced Retransmission Technique for VoiP",2016IEEE, total:4pages.

Fatiha Merazka et al.,"Dynamic Forward Error Correction Algotithm over IP Network Sercives for ITU-TG.722.2 Codec",2015ICITST,total:4pages.

* cited by examiner

DATA STREAM TRANSMISSION METHOD AND DEVICE

CROSS-REFERENCE TO RELATED APPLICATIONS

This application is a continuation of International Application No. PCT/CN2020/083713, filed on Apr. 8, 2020, which claims priority to Chinese Patent Application No. 201910277087.X, filed on Apr. 8, 2019. The disclosures of the aforementioned applications are hereby incorporated by reference in their entireties.

TECHNICAL FIELD

Embodiments of this application relate to the communications field, and in particular, to a data stream transmission method and device.

BACKGROUND

In the communications field, a packet may be lost during packet transmission due to network instability. For example, on the internet (internet), if network congestion occurs, packet overflow may be caused on an intermediate device (such as a router) due to insufficient receive buffer. As a result, a packet loss occurs. Currently, a fixed packet-loss-concealment policy is usually used to generate a packet-loss-concealment packet, to recover a packet lost in a transmission process. However, because the fixed packet-loss-concealment policy is used, a packet loss recovery effect is not good. For example, for some services that are very sensitive to a packet loss, such as a video conference service, artifacts occur on an output image, affecting user experience.

SUMMARY

Embodiments of this application provide a data stream transmission method and device, to resolve a problem that a packet loss recovery effect is relatively poor because a fixed packet-loss-concealment policy is used.

According to a first aspect, a data stream transmission method is provided. The method includes:

A sending device determines a packet-loss-concealment policy based on first path status information of a path used to send a data stream. The sending device generates a packet-loss-concealment packet for the data stream according to the packet-loss-concealment policy. The sending device sends the data stream on the path, where the data stream includes an original packet and the packet-loss-concealment packet.

The packet-loss-concealment packet is generated for the data stream by using the packet-loss-concealment policy dynamically determined based on the status information of the path used to send the data stream, instead of using a preset fixed packet-loss-concealment policy. Therefore, the packet-loss-concealment packet is used to recover a packet lost in a transmission process, to effectively improve a packet loss recovery effect, thereby effectively reducing a packet loss rate obtained after the packet loss recovery, and further improving user experience.

With reference to the first aspect, in a first possible implementation of the first aspect, before the sending device determines the packet-loss-concealment policy based on the first path status information of the path used to send the data stream, the method further includes:

The sending device determines, based on second path status information of at least two paths from the sending device to a receiving device, the path used to send the data stream.

With reference to the first possible implementation of the first aspect, in a second possible implementation of the first aspect, the second path status information includes a packet loss rate.

With reference to the second possible implementation of the first aspect, in a third possible implementation of the first aspect, the second path status information further includes at least one of a delay, a network jitter, a bandwidth, or a delay difference.

With reference to any one of the first aspect or the foregoing possible implementations of the first aspect, in a possible implementation of the first aspect, one or two paths are used to send the data stream.

With reference to any one of the first aspect or the foregoing possible implementations of the first aspect, in a fourth possible implementation of the first aspect, when there are two paths used to send the data stream, a delay difference of the paths used to send the data stream is less than a delay difference threshold.

With reference to any one of the first aspect or the foregoing possible implementations of the first aspect, in a fifth possible implementation of the first aspect, that a sending device determines a packet-loss-concealment policy based on first path status information of a path used to send a data stream includes:

The sending device determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

With reference to any one of the first aspect or the foregoing possible implementations of the first aspect, in a sixth possible implementation of the first aspect, the first path status information includes at least one of the delay or the packet loss rate.

With reference to any one of the first aspect or the foregoing possible implementations of the first aspect, in a seventh possible implementation of the first aspect, the packet-loss-concealment policy includes at least one of automatic repeat request ARQ, packet duplication, or forward error correction FEC.

With reference to any one of the first aspect or the foregoing possible implementations of the first aspect, in an eighth possible implementation of the first aspect, when the packet-loss-concealment policy is forward error correction FEC, the packet-loss-concealment packet is a redundant packet. That the sending device generates a packet-loss-concealment packet for the data stream according to the packet-loss-concealment policy includes:

determining an FEC coding scheme, where the coding scheme includes block coding or convolutional coding; and encoding the original packet based on the determined coding scheme, to generate a redundant packet.

With reference to any one of the first aspect or the foregoing possible implementations of the first aspect, in a ninth possible implementation of the first aspect, the method further includes:

The sending device sends a packet-loss-concealment control message to the receiving device, where the packet-loss-concealment control message includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to any one of the first aspect or the foregoing possible implementations of the first aspect, in a tenth possible implementation of the first aspect, the packet-loss-concealment packet includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to the ninth possible implementation of the first aspect, in an eleventh possible implementation of the first aspect, the indication information is further used to indicate an identifier of the data stream and an identifier of the path used to send the data stream.

With reference to the tenth possible implementation of the first aspect, in a twelfth possible implementation of the first aspect, the indication information is further used to indicate an identifier of the path used to send the data stream.

With reference to the tenth or the twelfth possible implementation of the first aspect, in a thirteenth possible implementation of the first aspect, the indication information is carried in an extension field of the packet-loss-concealment packet.

With reference to the ninth or the eleventh possible implementation of the first aspect, in a possible implementation, the packet-loss-concealment message further includes a coding parameter of the packet-loss-concealment packet. When the packet-loss-concealment policy is FEC, the coding parameter includes block coding or convolutional coding used for encoding.

With reference to the tenth or the twelfth possible implementation of the first aspect, in a possible implementation, the packet-loss-concealment packet further includes a coding parameter of the packet-loss-concealment packet. When the packet-loss-concealment policy is FEC, the coding parameter includes block coding or convolutional coding used for encoding.

With reference to any one of the first aspect or the foregoing possible implementations of the first aspect, in a fourteenth possible implementation of the first aspect, when the data stream is sent on two paths, that the sending device sends the data stream on the path includes:

sending the original packet on a path with a longer delay in the two paths; and sending the packet-loss-concealment packet on a path with a shorter delay in the two paths, where the packet-loss-concealment packet is sent after the original packet is sent, the original packet and the packet-loss-concealment packet are sent at a time interval t, and t is a one-way delay difference of sending the data stream on the two paths.

According to a second aspect, a data stream transmission method is provided. The method includes:

A receiving device receives an original packet and a packet-loss-concealment packet that are of a data stream and that are sent by a sending device, where the packet-loss-concealment packet is generated according to a packet-loss-concealment policy, and the packet-loss-concealment policy is determined by the sending device based on path status information of a path used to send the data stream. The packet-loss-concealment packet is generated by using the dynamically determined packet-loss-concealment policy, to recover a lost original packet. That is, an original packet lost in a transmission process is recovered by using the packet-loss-concealment packet. This effectively reduces a packet loss rate obtained after the packet loss recovery, and improves user experience.

With reference to the second aspect, in a first possible implementation of the second aspect, before the lost original packet is recovered by using the packet-loss-concealment packet, the method further includes:

receiving a packet-loss-concealment control message, where the packet-loss-concealment control message includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to the second aspect, in a second possible implementation of the second aspect, the packet-loss-concealment packet includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to the first possible implementation of the second aspect, in a third possible implementation of the second aspect, the indication information is further used to indicate an identifier of the data stream and an identifier of the path used to send the data stream.

With reference to the second possible implementation of the second aspect, in a fourth possible implementation of the second aspect, the indication information is further used to indicate an identifier used to send the data stream.

With reference to the second or the fourth possible implementation of the second aspect, in a possible implementation, the indication information is carried in an extension field of the packet-loss-concealment packet.

With reference to the first or the fourth possible implementation of the second aspect, in a possible implementation, the packet-loss-concealment message further includes a coding parameter of the packet-loss-concealment packet. When the packet-loss-concealment policy is FEC, the coding parameter includes block coding or convolutional coding used for encoding.

With reference to the second, the fourth, or the fifth possible implementation of the second aspect, the packet-loss-concealment packet further includes a coding parameter of the packet-loss-concealment packet. When the packet-loss-concealment policy is FEC, the coding parameter includes block coding or convolutional coding used for encoding.

According to a third aspect, a data stream transmission method is provided. The method includes:

A control device determines a packet-loss-concealment policy based on first path status information of a path used to send a data stream. The control device sends the packet-loss-concealment policy to a sending device, where the packet-loss-concealment policy is used by the sending device to generate a packet-loss-concealment packet for the data stream. Therefore, the packet-loss-concealment packet generated by using the dynamically determined packet-loss-concealment policy is used to recover a packet lost in a transmission process. This effectively improves a packet loss recovery effect, thereby effectively reducing a packet loss rate and further improving user experience.

With reference to the third aspect, in a first possible implementation of the third aspect, before the control device determines the packet-loss-concealment policy based on the first path status information of the path used to send the data stream, the method further includes:

The control device determines, based on second path status information of at least two paths from the sending device to a receiving device, the path used to send the data stream.

With reference to the first possible implementation of the third aspect, in a second possible implementation of the third aspect, the second path status information includes a packet loss rate.

With reference to the second possible implementation of the third aspect, in a third possible implementation of the third aspect, the second path status information further includes at least one of a delay, a network jitter, a bandwidth, or a delay difference.

With reference to any one of the third aspect or the foregoing possible implementations of the third aspect, in a possible implementation of the third aspect, one or two paths are used to send the data stream.

With reference to any one of the third aspect or the foregoing possible implementations of the third aspect, in a fourth possible implementation of the third aspect, when there are two paths used to send the data stream, a delay difference of the paths used to send the data stream is less than a delay difference threshold.

With reference to any one of the third aspect or the foregoing possible implementations of the third aspect, in a fifth possible implementation of the third aspect, that a control device determines a packet-loss-concealment policy based on first path status information of a path used to send a data stream includes:

The control device determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

With reference to any one of the third aspect or the foregoing possible implementations of the third aspect, in a sixth possible implementation of the third aspect, the first path status information includes at least one of the delay or the packet loss rate.

With reference to any one of the third aspect or the foregoing possible implementations of the third aspect, in a seventh possible implementation of the third aspect, the packet-loss-concealment policy includes at least one of automatic repeat request ARQ, packet duplication, or forward error correction FEC.

According to a fourth aspect, a data stream transmission device is provided. The device includes:
 a determining unit, configured to determine a packet-loss-concealment policy based on first path status information of a path used to send a data stream;
 a generation unit, configured to generate a packet-loss-concealment packet for the data stream according to the packet-loss-concealment policy; and
 a sending unit, configured to send the data stream on the path, where the data stream includes an original packet and the packet-loss-concealment packet.

The device generates the packet-loss-concealment packet for the data stream by using the packet-loss-concealment policy dynamically determined based on the status information of the path used to send the data stream, and recovers, by using the packet-loss-concealment packet, a packet lost in a transmission process, thereby effectively improving a packet loss recovery effect, and effectively reducing a packet loss rate.

With reference to the fourth aspect, in a first possible implementation of the fourth aspect, the determining unit is further configured to determine, based on second path status information of at least two paths from a sending device to a receiving device, the path used to send the data stream.

With reference to the first possible implementation of the fourth aspect, in a second possible implementation of the fourth aspect, the second path status information includes a packet loss rate.

With reference to the second possible implementation of the fourth aspect, in a third possible implementation of the fourth aspect, the second path status information further includes at least one of a delay, a network jitter, a bandwidth, or a delay difference.

With reference to any one of the fourth aspect or the foregoing possible implementations of the fourth aspect, in a possible implementation of the fourth aspect, one or two paths are used to send the data stream.

With reference to any one of the fourth aspect or the foregoing possible implementations of the fourth aspect, in a fourth possible implementation of the fourth aspect, when there are two paths used to send the data stream, a delay difference of the paths used to send the data stream is less than a delay difference threshold.

With reference to any one of the fourth aspect or the foregoing possible implementations of the fourth aspect, in a fifth possible implementation of the fourth aspect, that the determining unit determines the packet-loss-concealment policy based on the first path status information of the path used to send the data stream includes:

The determining unit determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

With reference to any one of the fourth aspect or the foregoing possible implementations of the fourth aspect, in a sixth possible implementation of the fourth aspect, the first path status information includes at least one of the delay or the packet loss rate.

With reference to any one of the fourth aspect or the foregoing possible implementations of the fourth aspect, in a seventh possible implementation of the fourth aspect, the packet-loss-concealment policy includes at least one of automatic repeat request ARQ, packet duplication, or forward error correction FEC.

With reference to any one of the fourth aspect or the foregoing possible implementations of the fourth aspect, in an eighth possible implementation of the fourth aspect, when the packet-loss-concealment policy is forward error correction FEC, the packet-loss-concealment packet is a redundant packet. That the generation unit generates the packet-loss-concealment packet for the data stream according to the packet-loss-concealment policy includes:

The determining unit determines an FEC coding scheme, where the coding scheme includes block coding or convolutional coding.

The generation unit encodes the original packet based on the determined coding scheme, to generate a redundant packet.

With reference to any one of the fourth aspect or the foregoing possible implementations of the fourth aspect, in a ninth possible implementation of the fourth aspect, the sending unit is further configured to send a packet-loss-concealment control message to the receiving device, where the packet-loss-concealment control message includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to any one of the fourth aspect or the foregoing possible implementations of the fourth aspect, in a tenth possible implementation of the fourth aspect, the packet-loss-concealment packet includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to the ninth possible implementation of the fourth aspect, in an eleventh possible implementation of the fourth aspect, the indication information is further used to indicate an identifier of the data stream and an identifier of the path used to send the data stream.

With reference to the tenth possible implementation of the fourth aspect, in a twelfth possible implementation of the fourth aspect, the indication information is further used to indicate an identifier of the path used to send the data stream.

With reference to the tenth or the twelfth possible implementation of the fourth aspect, in a thirteenth possible implementation of the fourth aspect, the indication information is carried in an extension field of the packet-loss-concealment packet.

With reference to the ninth or the eleventh possible implementation of the fourth aspect, in a possible implementation, the packet-loss-concealment message further includes a coding parameter of the packet-loss-concealment packet. When the packet-loss-concealment policy is FEC, the coding parameter includes block coding or convolutional coding used for encoding.

With reference to the tenth or the twelfth possible implementation of the fourth aspect, in a possible implementation, the packet-loss-concealment packet further includes a coding parameter of the packet-loss-concealment packet. When the packet-loss-concealment policy is FEC, the coding parameter includes block coding or convolutional coding used for encoding.

With reference to any one of the fourth aspect or the foregoing possible implementations of the fourth aspect, in a fourteenth possible implementation of the fourth aspect, when the data stream is sent on two paths, that the sending unit sends the data stream on the path includes:
  sending the original packet on a path with a longer delay in the two paths; and
  sending the packet-loss-concealment packet on a path with a shorter delay in the two paths, where the packet-loss-concealment packet is sent after the original packet is sent, the original packet and the packet-loss-concealment packet are sent at a time interval t, and t is a one-way delay difference of sending the data stream on the two paths.

According to a fifth aspect, a data stream transmission device is provided. The device includes:
  a receiving unit, configured to receive an original packet and a packet-loss-concealment packet that are of a data stream and that are sent by a sending device, where the packet-loss-concealment packet is generated according to a packet-loss-concealment policy, and the packet-loss-concealment policy is determined by the sending device based on path status information of a path used to send the data stream; and
  a processing unit, configured to recover a lost original packet by using the packet-loss-concealment packet. To be specific, the original packet lost in a transmission process is recovered by using the packet-loss-concealment packet generated based on the dynamically determined packet-loss-concealment policy. This effectively reduces a packet loss rate obtained after the packet loss recovery, and improves user experience.

With reference to the fifth aspect, in a first possible implementation of the fifth aspect, the receiving unit is further configured to receive a packet-loss-concealment control message, where the packet-loss-concealment control message includes indication information, and the indication information is used to indicate the packet-loss-concealment policy that is for the data stream. Therefore, when receiving the packet-loss-concealment policy, a receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to the fifth aspect, in a second possible implementation of the fifth aspect, the packet-loss-concealment packet includes indication information, and the indication information is used to indicate the packet-loss-concealment policy that is for the data stream. Therefore, when receiving the packet-loss-concealment policy, a receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to the first possible implementation of the fifth aspect, in a third possible implementation of the fifth aspect, the indication information is further used to indicate an identifier of the data stream and an identifier of the path used to send the data stream.

With reference to the second possible implementation of the fifth aspect, in a fourth possible implementation of the fifth aspect, the indication information is further used to indicate an identifier of the path used to send the data stream.

With reference to the second or the fourth possible implementation of the fifth aspect, in a possible implementation, the indication information is carried in an extension field of the packet-loss-concealment packet.

With reference to the first or the fourth possible implementation of the fifth aspect, in a possible implementation, the packet-loss-concealment message further includes a coding parameter of the packet-loss-concealment packet. When the packet-loss-concealment policy is FEC, the coding parameter includes block coding or convolutional coding used for encoding.

With reference to the second, the fourth, or the fifth possible implementation of the fifth aspect, the packet-loss-concealment packet further includes a coding parameter of the packet-loss-concealment packet. When the packet-loss-concealment policy is FEC, the coding parameter includes block coding or convolutional coding used for encoding.

According to a sixth aspect, a data stream transmission device is provided. The device includes:

a determining unit, configured to determine a packet-loss-concealment policy based on first path status information of a path used to send a data stream; and a sending unit, configured to send the packet-loss-concealment policy to a sending device, where the packet-loss-concealment policy is used by the sending device to generate a packet-loss-concealment packet for the data stream. Therefore, the packet-loss-concealment packet generated by using the dynamically determined packet-loss-concealment policy is used to recover a packet lost in a transmission process. This effectively improves a packet loss recovery effect, thereby effectively reducing a packet loss rate and further improving user experience.

With reference to the sixth aspect, in a first possible implementation of the sixth aspect, the determining unit is further configured to determine, based on second path status information of at least two paths from the sending device to a receiving device, the path used to send the data stream.

With reference to the first possible implementation of the sixth aspect, in a second possible implementation of the sixth aspect, the second path status information includes a packet loss rate.

With reference to the second possible implementation of the sixth aspect, in a third possible implementation of the sixth aspect, the second path status information further includes at least one of a delay, a network jitter, a bandwidth, or a delay difference.

With reference to any one of the sixth aspect or the foregoing possible implementations of the sixth aspect, in a possible implementation of the sixth aspect, one or two paths are used to send the data stream.

With reference to any one of the sixth aspect or the foregoing possible implementations of the sixth aspect, in a fourth possible implementation of the sixth aspect, when there are two paths used to send the data stream, a delay difference of the paths used to send the data stream is less than a delay difference threshold.

With reference to any one of the sixth aspect or the foregoing possible implementations of the sixth aspect, in a fifth possible implementation of the sixth aspect, that the determining unit determines the packet-loss-concealment policy based on the first path status information of the path used to send the data stream includes:

The determining unit determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

With reference to any one of the sixth aspect or the foregoing possible implementations of the sixth aspect, in a sixth possible implementation of the sixth aspect, the first path status information includes at least one of the delay or the packet loss rate.

With reference to any one of the sixth aspect or the foregoing possible implementations of the sixth aspect, in a seventh possible implementation of the sixth aspect, the packet-loss-concealment policy includes at least one of automatic repeat request ARQ, packet duplication, or forward error correction FEC.

According to a seventh aspect, a data stream transmission device is provided. The device includes:

a processor, configured to determine a packet-loss-concealment policy based on first path status information of a path used to send a data stream, where the processor is further configured to generate a packet-loss-concealment packet for the data stream according to the packet-loss-concealment policy; and a transmitter, configured to send the data stream on the path, where the data stream includes an original packet and the packet-loss-concealment packet.

The packet-loss-concealment packet is generated for the data stream by using the packet-loss-concealment policy dynamically determined based on the status information of the path used to send the data stream, and recovers, by using the packet-loss-concealment packet, a packet lost in a transmission process. This effectively improves a packet loss recovery effect, thereby effectively reducing a packet loss rate and further improving user experience.

With reference to the seventh aspect, in a possible implementation of the seventh aspect, the processor unit is further configured to determine, based on second path status information of at least two paths from a sending device to a receiving device, the path used to send the data stream.

With reference to the first possible implementation of the seventh aspect, in a second possible implementation of the seventh aspect, the second path status information includes a packet loss rate.

With reference to the second possible implementation of the seventh aspect, in a third possible implementation of the seventh aspect, the second path status information further includes at least one of a delay, a network jitter, a bandwidth, or a delay difference.

With reference to any one of the seventh aspect or the foregoing possible implementations of the seventh aspect, in a possible implementation of the seventh aspect, one or two paths are used to send the data stream.

With reference to any one of the seventh aspect or the foregoing possible implementations of the seventh aspect, in a fourth possible implementation of the seventh aspect, when there are two paths used to send the data stream, a delay difference of the paths used to send the data stream is less than a delay difference threshold.

With reference to any one of the seventh aspect or the foregoing possible implementations of the seventh aspect, in a fifth possible implementation of the seventh aspect, that the processor determines the packet-loss-concealment policy based on the first path status information of the path used to send the data stream includes:

The processor determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

With reference to any one of the seventh aspect or the foregoing possible implementations of the seventh aspect, in a sixth possible implementation of the seventh aspect, the first path status information includes at least one of the delay or the packet loss rate.

With reference to any one of the seventh aspect or the foregoing possible implementations of the seventh aspect, in a seventh possible implementation of the seventh aspect, the packet-loss-concealment policy includes at least one of automatic repeat request ARQ, packet duplication, or forward error correction FEC.

With reference to any one of the seventh aspect or the foregoing possible implementations of the seventh aspect, in an eighth possible implementation of the seventh aspect, when the packet-loss-concealment policy is forward error correction FEC, the packet-loss-concealment packet is a redundant packet. That the processor generates the packet-loss-concealment packet for the data stream according to the packet-loss-concealment policy includes:

The processor determines an FEC coding scheme, where the coding scheme includes block coding or convolutional coding.

The processor encodes the original packet based on the determined coding scheme, to generate a redundant packet.

With reference to any one of the seventh aspect or the foregoing possible implementations of the seventh aspect, in a ninth possible implementation of the seventh aspect, the transmitter is further configured to send a packet-loss-concealment control message to the receiving device, where the packet-loss-concealment control message includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to any one of the seventh aspect or the foregoing possible implementations of the seventh aspect, in a tenth possible implementation of the seventh aspect, the packet-loss-concealment packet includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to the ninth possible implementation of the seventh aspect, in an eleventh possible implementation of the seventh aspect, the indication information is further used to indicate an identifier of the data stream and an identifier of the path used to send the data stream.

With reference to the tenth possible implementation of the seventh aspect, in a twelfth possible implementation of the seventh aspect, the indication information is further used to indicate an identifier of the path used to send the data stream.

With reference to the tenth or the twelfth possible implementation of the seventh aspect, in a thirteenth possible implementation of the seventh aspect, the indication information is carried in an extension field of the packet-loss-concealment packet.

With reference to the ninth or the eleventh possible implementation of the seventh aspect, in a possible implementation, the packet-loss-concealment message further includes a coding parameter of the packet-loss-concealment packet. When the packet-loss-concealment policy is FEC, the coding parameter includes block coding or convolutional coding used for encoding.

With reference to the tenth or the twelfth possible implementation of the seventh aspect, in a possible implementation, the packet-loss-concealment packet further includes a coding parameter of the packet-loss-concealment packet. When the packet-loss-concealment policy is FEC, the coding parameter includes block coding or convolutional coding used for encoding.

With reference to any one of the seventh aspect or the foregoing possible implementations of the seventh aspect, in a fourteenth possible implementation of the seventh aspect, when the data stream is sent on two paths, that the transmitter sends the data stream on the path includes:
    sending the original packet on a path with a longer delay in the two paths; and
    sending the packet-loss-concealment packet on a path with a shorter delay in the two paths, where the packet-loss-concealment packet is sent after the original packet is sent, the original packet and the packet-loss-concealment packet are sent at a time interval t, and t is a one-way delay difference of sending the data stream on the two paths.

According to an eighth aspect, a data stream transmission device is provided. The device includes:
    a receiver, configured to receive an original packet and a packet-loss-concealment packet that are of a data stream and that are sent by a sending device, where the packet-loss-concealment packet is generated according to a packet-loss-concealment policy, and the packet-loss-concealment policy is determined by the sending device based on path status information of a path used to send the data stream; and
    a processor, configured to recover a lost original packet by using the packet-loss-concealment packet.

The packet-loss-concealment packet is generated by using the packet-loss-concealment policy determined based on the status information of the path used to send the data stream, and the original packet lost in a transmission process is recovered by using the packet-loss-concealment packet, thereby effectively reducing a packet loss rate and further improving user experience.

With reference to the eighth aspect, in a first possible implementation of the eighth aspect, the receiver is further configured to receive a packet-loss-concealment control message, where the packet-loss-concealment control message includes indication information, and the indication information is used to indicate the packet-loss-concealment policy that is for the data stream. Therefore, when receiving the packet-loss-concealment policy, a receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to the eighth aspect, in a second possible implementation of the eighth aspect, the packet-loss-concealment packet includes indication information, and the indication information is used to indicate the packet-loss-concealment policy that is for the data stream. Therefore, when receiving the packet-loss-concealment policy, a receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

With reference to the first possible implementation of the eighth aspect, in a third possible implementation of the eighth aspect, the indication information is further used to indicate an identifier of the data stream and an identifier of the path used to send the data stream.

With reference to the second possible implementation of the eighth aspect, in a fourth possible implementation of the eighth aspect, the indication information is further used to indicate an identifier of the path used to send the data stream.

With reference to the second or the fourth possible implementation of the eighth aspect, in a possible implementation, the indication information is carried in an extension field of the packet-loss-concealment packet.

With reference to the first or the fourth possible implementation of the eighth aspect, in a possible implementation, the packet-loss-concealment message further includes a coding parameter of the packet-loss-concealment packet. When the packet-loss-concealment policy is FEC, the coding parameter includes block coding or convolutional coding used for encoding.

With reference to the second, the fourth, or the fifth possible implementation of the eighth aspect, the packet-loss-concealment packet further includes a coding parameter of the packet-loss-concealment packet. When the packet-loss-concealment policy is FEC, the coding parameter includes block coding or convolutional coding used for encoding.

According to a ninth aspect, a data stream transmission device is provided. The device includes:
    a processor, configured to determine a packet-loss-concealment policy based on first path status information of a path used to send a data stream; and
    a transmitter, configured to send the packet-loss-concealment policy to a sending device, where the packet-loss-concealment policy is used by the sending device to generate a packet-loss-concealment packet for the data stream. Therefore, the packet-loss-concealment packet generated by using the dynamically determined packet-loss-concealment policy is used to recover a packet lost in a transmission process. This effectively improves a packet loss recovery effect, thereby effectively reducing a packet loss rate and further improving user experience.

With reference to the ninth aspect, in a first possible implementation of the ninth aspect, the processor is further configured to determine, based on second path status information of at least two paths from the sending device to a receiving device, the path used to send the data stream.

With reference to the first possible implementation of the ninth aspect, in a second possible implementation of the ninth aspect, the second path status information includes a packet loss rate.

With reference to the second possible implementation of the ninth aspect, in a third possible implementation of the ninth aspect, the second path status information further includes at least one of a delay, a network jitter, a bandwidth, or a delay difference.

With reference to any one of the ninth aspect or the foregoing possible implementations of the ninth aspect, in a possible implementation of the ninth aspect, one or two paths are used to send the data stream.

With reference to any one of the ninth aspect or the foregoing possible implementations of the ninth aspect, in a fourth possible implementation of the ninth aspect, when there are two paths used to send the data stream, a delay difference of the paths used to send the data stream is less than a delay difference threshold.

With reference to any one of the ninth aspect or the foregoing possible implementations of the ninth aspect, in a fifth possible implementation of the ninth aspect, that the processor determines the packet-loss-concealment policy based on the first path status information of the path used to send the data stream includes:

The processor determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

With reference to any one of the ninth aspect or the foregoing possible implementations of the ninth aspect, in a sixth possible implementation of the ninth aspect, the first path status information includes at least one of the delay or the packet loss rate.

With reference to any one of the ninth aspect or the foregoing possible implementations of the ninth aspect, in a seventh possible implementation of the ninth aspect, the packet-loss-concealment policy includes at least one of automatic repeat request ARQ, packet duplication, or forward error correction FEC.

According to a tenth aspect, a computer program product including instructions is provided. When the instructions are run on a computer, the computer is enabled to perform the method according to any possible implementation of the first to the third aspects.

An embodiment of this application provides a computer-readable storage medium, configured to store instructions. When the instructions are executed on a computer, the method according to any possible implementation of the first to the third aspects is implemented.

Based on the data stream transmission method and device that are provided, the sending device dynamically determines the packet-loss-concealment policy based on the path status information of the path used to send the data stream, generates the packet-loss-concealment packet for the data stream according to the packet-loss-concealment policy, and then sends the data stream including the original packet and the packet-loss-concealment packet on the path. Therefore, when receiving the data stream, the receiving device decodes the data stream according to the packet-loss-concealment policy received from the sending device, and recovers, by using the packet-loss-concealment packet, an original packet lost in the transmission process. This effectively reduces a packet loss rate obtained after the packet loss recovery, and improves user experience.

DESCRIPTION OF EMBODIMENTS

Embodiments of this application provide a data stream transmission method and device, which may be applied to a scenario such as a software-defined wide area network (software defined-wide area network, SD-WAN) and are specific to a service that is sensitive to a packet loss, for example, a video conference service.

In the embodiments, there are a plurality of paths between a sending device and a receiving device. For example, in an SD-WAN scenario, there are a plurality of WAN links between customer premise equipment, as shown in FIG. 1.

Figure 1:
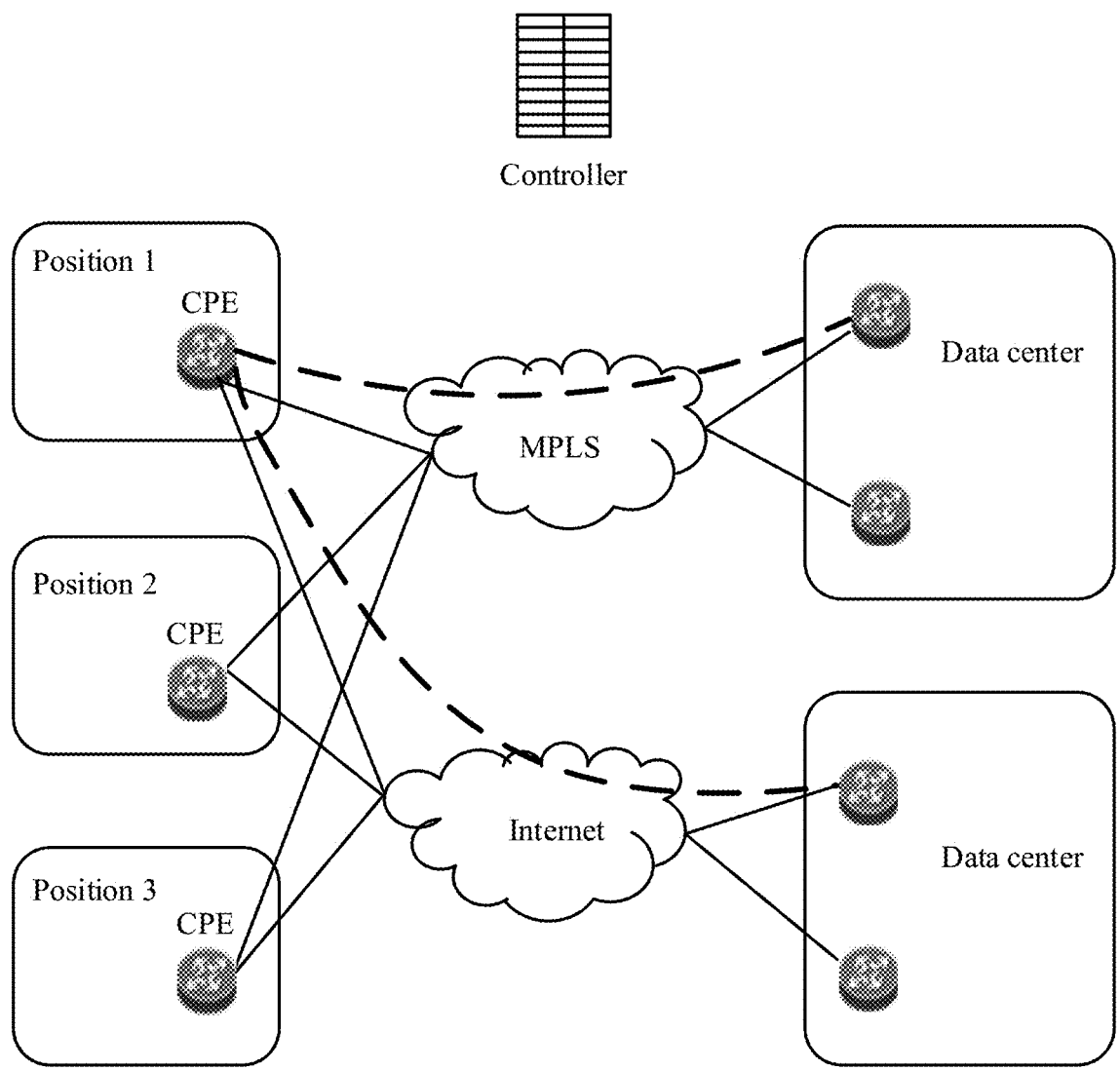
FIG. 1 is a schematic diagram of a basic network architecture of an SD-WAN according to an embodiment of this application.

FIG. 1 is a schematic diagram of a basic network architecture of an SD-WAN. As shown in FIG. 1, the basic network architecture of the SD-WAN includes customer premise equipment (customer premise equipment, CPE) located in a plurality of positions (also referred to as sites). The customer premise equipment may be physical customer premise equipment, or may be virtual customer premise equipment (virtual customer premise equipment, vCPE). The vCPE runs on a general-purpose server.

Each piece of customer premise equipment has two or more WAN connections. That is, there are two or more WAN links used to transmit data streams between customer premise equipment, and the WAN links are independent of each other. For example, the WAN links form an overlay (overlay) network by using tunneling technologies such as internet protocol security (internet protocol security, IPSec), to be independent of an underlying transmission network. High-availability (active-active) load balancing can be implemented among a plurality of WANs.

The SD-WAN system includes a controller, configured to perform centralized application performance monitoring and policy management on other devices such as the customer premise equipment in the system.

Figure 2:
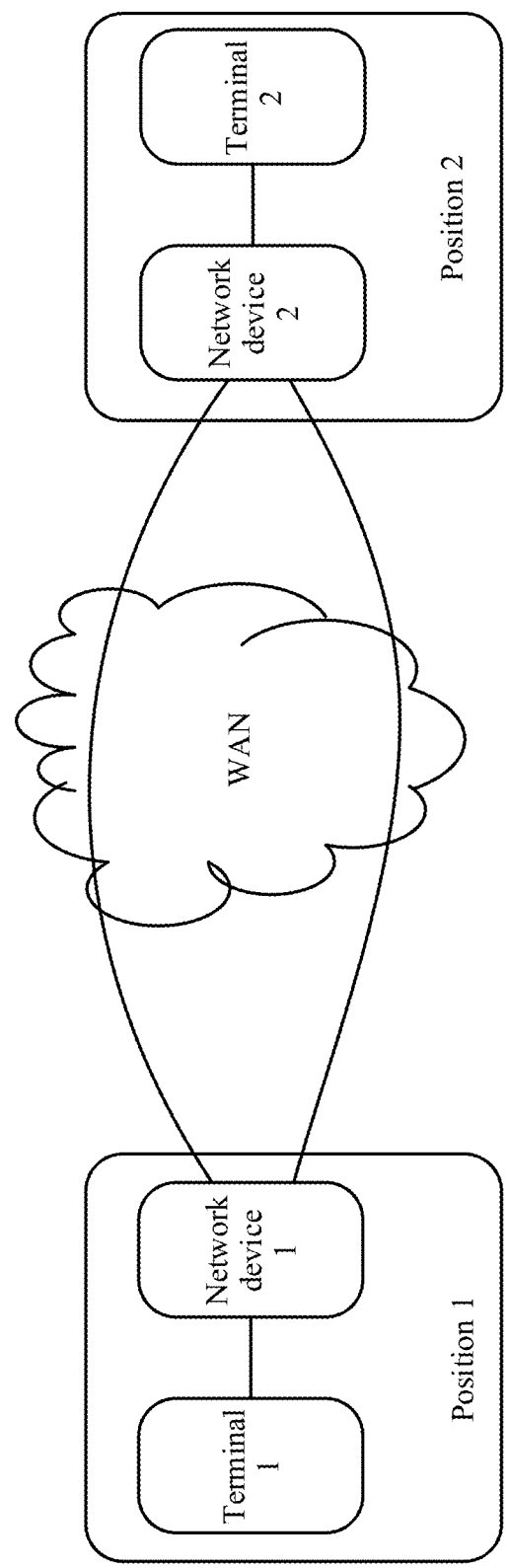
FIG. 2 is a schematic diagram of a data stream transmission process according to an embodiment of this application.

In the SD-WAN system, a data stream transmission process is shown in FIG. 2. In FIG. 2, an example in which a terminal 1 sends an audio and video stream to a terminal 2 is used. The terminal 1 encodes the to-be-sent audio and video stream, and sends an encoded audio and video stream to a network device 1. The network device 1 forwards the encoded audio and video stream to a network device 2 by using a plurality of WAN links. Then, the network device 2 sends the received audio and video stream to the terminal 2. After receiving the audio and video stream, the terminal 2 decodes the audio and video stream by using a decoding technology, and recovers an original video and original audio from the audio and video stream. If the terminal 2 is an intelligent device, for example, a device having a display such as a mobile phone or a computer, the terminal 2 plays the decoded video and decoded audio on the display.

The terminal 1 and the terminal 2 may be devices such as intelligent terminals (for example, mobile phones or tablet computers), cameras, or terminals (for example, Skype) for audio and video encoding and decoding. The network device 1 and the network device 2 may be devices such as routers, switches, and servers.

Because the WAN links are unstable, there may be a packet loss during data stream transmission on the WAN links. In the data stream transmission process in the SD-WAN, if a transmitted data stream (such as an audio and video packet) is scheduled to a WAN link with poor quality, a large quantity of packets may be lost, greatly affecting user experience.

In addition, because two or more WAN links in the SD-WAN are independent of each other, the WAN links cannot be connected and unified to provide reliable transmission for one audio and video stream. If one audio and video stream is transmitted over different WAN links simply through packet-level load balancing scheduling, a transmission effect of a plurality of bound WAN links may be worse than that of a single WAN link due to differences in packet loss rates, delays, jitters, and the like of the WAN links. In other words, when a plurality of WAN links are bound to transmit an audio and video stream, a sum of transmission effects of the plurality of WAN links is worse than a transmission effect of a single WAN link, an effect of 1+1<1 is achieved.

In the current technology, a preset fixed packet-loss-concealment policy such as FEC, packet duplication, or automatic retransmission is used to generate a packet-loss-concealment packet for a data stream that needs to be sent. In a case of relatively poor path status information, when the packet-loss-concealment packet generated by using the fixed packet-loss-concealment policy is used to recover a packet lost in a transmission process, a packet recovery effect is not good, and a packet loss rate is still very high after the packet loss recovery.

In view of this, some packet-loss-concealment technologies need to be used for a WAN link for transmitting a data stream. Therefore, the embodiments of this application provide a data stream transmission method and a network device. When a link status of a WAN link for sending a data stream is relatively poor, the network device determines a packet-loss-concealment policy based on the link status of the WAN link, generates a packet-loss-concealment packet for the to-be-sent data stream according to the packet-loss-concealment policy, and then sends, on one or two WAN links, the data stream that includes an original packet and the packet-loss-concealment packet. In the embodiments of this application, a packet-loss-concealment policy is dynamically determined based on status information of a path used to send a data stream, a packet-loss-concealment packet is generated for the data stream according to the packet-loss-concealment policy, and the data stream is sent to a receiving device on the path. When receiving the data stream, the receiving device recovers a lost original packet by using the packet-loss-concealment packet, thereby improving a packet loss recovery effect, and effectively reducing a packet loss rate obtained after the packet loss recovery. A transmission effect is similar to that of a better link (for example, a multi-protocol label switching (multi-protocol label switching, MPLS) link).

In the SD-WAN scenario, the WAN link is a path used to send a data stream, and link status information of the WAN link is referred to as path status information.

Common packet-loss-concealment policies include forward error correction (forward error correction, FEC), packet duplication, automatic repeat request (automatic repeat request, ARQ), and the like.

In FEC, a redundant packet is generated based on an original packet through specific encoding (for example, reed-solomon codes (reed-solomon codes, RS codes) coding in packet coding). In FEC, the packet-loss-concealment packet is a redundant packet. In a data stream transmission process, a transmit end sends a data stream including an original packet and a packet-loss-concealment packet. When receiving the data stream, a receive end decodes the data stream based on the packet-loss-concealment packet in the received data stream, to recover a lost original packet at a specific probability. FEC has advantages of no retransmission and high real-time performance, is applicable to common packet loss scenarios, and can be used to recover a lost packet at a specific probability.

In packet duplication, one or more copies (copy) of an original packet is/are made. The copy packet is referred to as a packet-loss-concealment packet. The copy packet is sent to a receive end, so that the receive end can recover a lost original packet based on the copy packet. Packet duplication has advantages of no retransmission and high real-time performance, is applicable to common packet loss scenarios, and can be used to recover a lost packet at a specific probability.

In ARQ, a receive end receives a data stream sent by a transmit end, and detects whether a packet loss occurs in the received data stream. When it is determined that a packet loss occurs, the receive end requests the transmit end to resend the data stream. An advantage of ARQ is that few extra bandwidth resources are occupied.

It should be noted that the transmit end and the receive end herein may be devices such as a terminal and a network device respectively.

Figure 3:
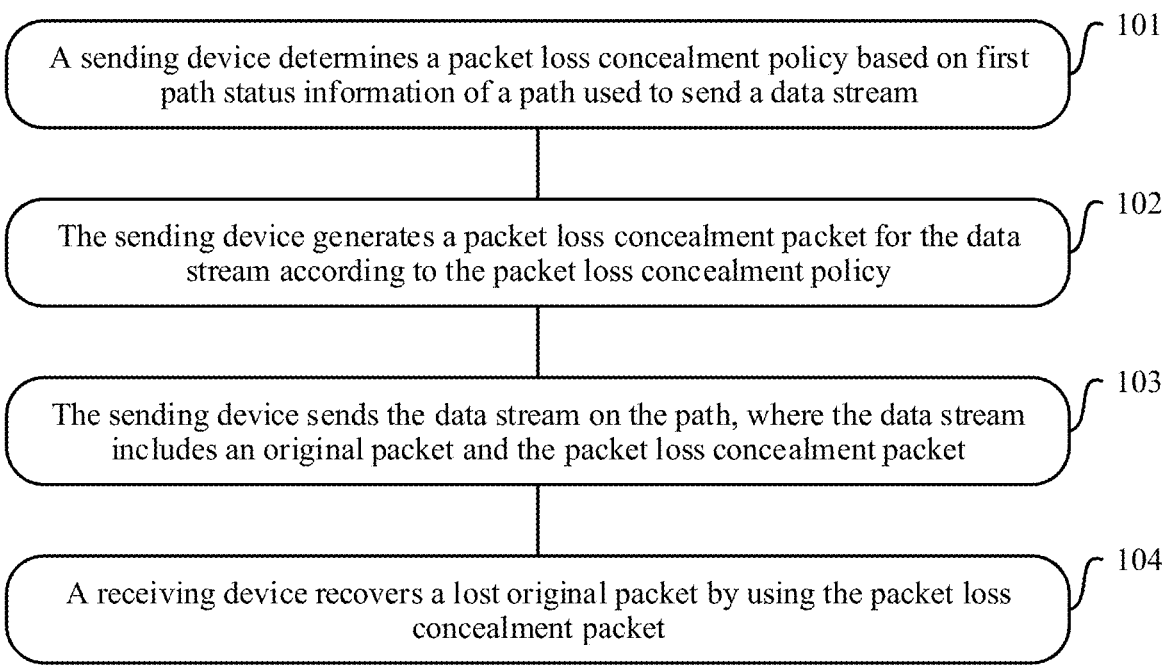
FIG. 3 is a schematic flowchart of a data stream transmission method according to an embodiment of this application.

With reference to FIG. 3, the following describes in detail the data stream transmission method provided in the embodiments of this application. As shown in FIG. 3, the method is performed by a sending device, and the sending device may be the network device shown in FIG. 2. It should be noted that "first" and "second" mentioned in the embodiments of this application are merely used to distinguish between objects, and do not limit the objects.

It should be further noted that, in the embodiments of this application, path status information of the path used to determine a path used to send a data stream is referred to as second path status information, and path status information of the path used to determine a packet-loss-concealment policy is referred to as first path status information. The first path status information and the second path status information are only used to distinguish between use scenarios, and do not constitute a limitation on path status information.

As shown in FIG. 3, the method may include the following steps.

S101: The sending device determines a packet-loss-concealment policy based on first path status information of a path used to send a data stream.

The path is a path through which the data stream passes from the sending device to a receiving device. The sending device dynamically determines, based on the first path status information of the path, such as a packet loss rate or a delay, the packet-loss-concealment policy (for example, FEC, packet duplication, or ARQ) that can enhance packet-loss-concealment, and then generates a packet-loss-concealment packet for the data stream according to the packet-loss-concealment policy. Therefore, when receiving the data stream sent by the sending device, the receiving device can recover, based on the packet-loss-concealment packet, a packet lost in a transmission process of the data stream.

For example, the sending device determines the packet-loss-concealment policy based on the packet loss rate and the delay that are in the first path status information of the path. In an embodiment, when the packet loss rate of the path is less than a preset packet loss rate threshold, and the delay of the path is less than a preset delay threshold, it is determined that the packet-loss-concealment policy to be used is ARQ.

In another embodiment, the sending device may determine the packet-loss-concealment policy based on the first path status information of the path and a packet-loss-concealment target value of the data stream, where the packet-loss-concealment target value includes a packet loss rate target value, the packet-loss-concealment target value includes a packet loss rate upper limit for transmitting the data stream. For example, for the packet-loss-concealment target value of the to-be-sent data stream, a total packet loss rate is set to be less than 0.01%, to ensure that a packet loss rate obtained after packet loss recovery is performed on the data stream by using the determined packet-loss-concealment policy is less than the packet loss rate upper limit.

When a packet loss rate of the path is less than a target packet loss rate 0.01% for the data stream packet-loss-concealment, and a delay of the path satisfies a delay target value that is set for a packet-loss-concealment target of the data stream, it is determined that the packet-loss-concealment policy to be used is FEC. For example, for the packet-loss-concealment target value of the to-be-sent data stream, the delay target is set to be less than 150 ms. If there are two paths used to send the data stream, namely, a path 1 and a path 2, a delay of the path 1 is 80 ms, and a delay of the path 2 is 120 ms, it can be determined that the packet-loss-concealment policy is FEC. In this case, delays caused by ARQ repeats on the path 1 and the path 2 cannot satisfy the target delay value (less than 150 ms) for transmitting the data stream. Therefore, ARQ cannot be used.

In another embodiment, the sending device may alternatively determine the packet-loss-concealment policy based on the first path status information of the path and a traffic rate of the data stream. For example, when a delay of the path is less than a preset threshold, and a traffic rate of transmitting the data stream on the path is less than a preset threshold, it is determined that the packet-loss-concealment policy to be used is packet duplication. When the delay of the path is greater than the preset threshold, and the traffic rate of transmitting the data stream on the path is greater than the preset threshold, it is determined that the packet-loss-concealment policy to be used is FEC.

When it is determined that the packet-loss-concealment policy to be used is FEC, a coding algorithm may be further determined based on the path status information of the path. For example, when a quantity of consecutive packets that are lost on the path is less than a preset threshold, FEC packet coding is used. When the quantity of consecutive packets that are lost on the path is greater than or equal to the preset threshold, FEC convolutional coding is used.

In an embodiment, the sending device may alternatively determine the packet-loss-concealment policy based on the first path status information of the path, a packet-loss-concealment target value of the data stream, and a traffic rate of the data stream. For example, whether the packet-loss-concealment target value, including a packet loss rate and a delay, that is set for sending the data stream is satisfied is first determined based on a packet loss rate and a delay of the path. When the packet loss rate and the delay are satisfied, the packet-loss-concealment policy to be used is determined based on the packet loss rate and the delay of the path, and the traffic rate of transmitting the data stream on the path. For example, when the delay of the path is less than a preset threshold, and the traffic rate of transmitting the data stream on the path is less than a preset threshold, it is determined that the packet-loss-concealment policy to be used is packet duplication. When the delay of the path is greater than the preset threshold, and the traffic rate of transmitting the data stream on the path is greater than the preset threshold, it is determined that the packet-loss-concealment policy to be used is FEC.

S102: The sending device generates the packet-loss-concealment packet for the data stream according to the packet-loss-concealment policy.

The sending device generates the packet-loss-concealment packet for the to-be-sent data stream according to the packet-loss-concealment policy determined in S101. For example, if the determined packet-loss-concealment policy is FEC, an original packet is encoded by using an FEC coding algorithm, to generate the packet-loss-concealment packet. In FEC, the packet-loss-concealment packet is also referred to as a redundant packet.

For example, if the determined packet-loss-concealment policy is packet duplication, the packet-loss-concealment packet is generated by duplicating an original packet.

S103: The sending device sends the data stream on the path, where the data stream includes the original packet and the packet-loss-concealment packet.

The sending device sends the original packet and the packet-loss-concealment packet to the receiving device. Therefore, after receiving the packet-loss-concealment packet, the receiving device recovers, based on the packet-loss-concealment packet, a packet lost in the transmission process. To be specific, the receiving device decodes an original packet and the packet-loss-concealment packet, and performs deduplication and re-arrangement to obtain an original data packet.

S104: The receiving device recovers a lost original packet by using the received packet-loss-concealment packet.

That is, the receiving device decodes the data stream according to the packet-loss-concealment policy received from the sending device, and re-arranges an original packet and the packet-loss-concealment packet.

Figure 4:
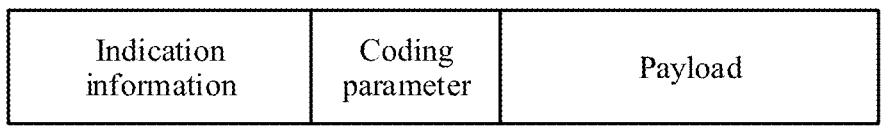
FIG. 4 is a schematic diagram of a format of a packet-loss-concealment packet according to an embodiment of this application.

In an embodiment, the packet-loss-concealment packet includes indication information, and the indication information is used to indicate the packet-loss-concealment policy that is for the packet-loss-concealment packet, such as ARQ, packet duplication, or FEC. A specific format of the packet-loss-concealment packet is shown in FIG. 4. In FIG. 4, the packet-loss-concealment packet includes the indication information and a payload (payload), where the payload is used to carry to-be-transmitted data.

The indication information may further be used to indicate an identifier used to send the data stream, for example, a 5-tuple of the data stream. In an embodiment, when there are two paths used to send the data stream, the indication information is used to indicate information such as an identifier of a path used to send an original packet and an identifier of a path used to send the packet-loss-concealment packet.

Optionally, in an embodiment, the packet-loss-concealment packet further includes a coding parameter of the packet-loss-concealment packet, as shown in FIG. 4. For example, if the packet-loss-concealment policy indicated by the indication information is FEC, the coding parameter of the packet-loss-concealment packet may carry FEC block coding or FEC convolutional coding. The block coding may include one of the following: RS coding, fountain coding, raptor coding, or LDPC coding. The convolutional coding may include LDPC coding or polar coding. In addition, the coding parameter of the packet-loss-concealment may further carry other related parameters, such as a block length and a quantity of redundant packets in the RS coding.

In an embodiment, the indication information is carried in an extension field of the packet-loss-concealment packet.

Optionally, in an embodiment, before the receiving device decodes the data stream and re-arranges the original packet and the packet-loss-concealment packet, the method further includes:

The receiving device receives a control message sent by the sending device, where the control message includes indication information, and the indication information indicates the packet-loss-concealment policy that is for the packet-loss-concealment packet, such as ARQ, packet duplication, and FEC. A specific packet-loss-concealment packet is shown in FIG. 4.

The indication information is further used to indicate information such as an identifier of the data stream and an identifier of the path used to send the data stream. In an embodiment, when there are two paths used to send the data stream, the indication information is used to indicate information such as an identifier of a path used to send an original packet and an identifier of a path used to send the packet-loss-concealment packet.

Optionally, in an embodiment, the control message may further include a coding parameter of the packet-loss-concealment packet. For example, if the packet-loss-concealment policy indicated by the indication information is FEC, the coding parameter of the packet-loss-concealment packet may carry FEC block coding or FEC convolutional coding. The block coding may include one of the following: RS coding, fountain coding, raptor coding, or LDPC coding. The convolutional coding may include LDPC coding or polar coding. In addition, the coding parameter of the packet-loss-concealment may further carry other related parameters, such as a block length and a quantity of redundant packets in the RS coding.

In this way, the receiving device decodes the packet-loss-concealment packet according to the packet-loss-concealment policy indicated by the indication information in the packet-loss-concealment packet or in the received control message, and re-arranges the original packet and the packet-loss-concealment packet to obtain an original data packet, that is, an original data stream.

Figure 5A:
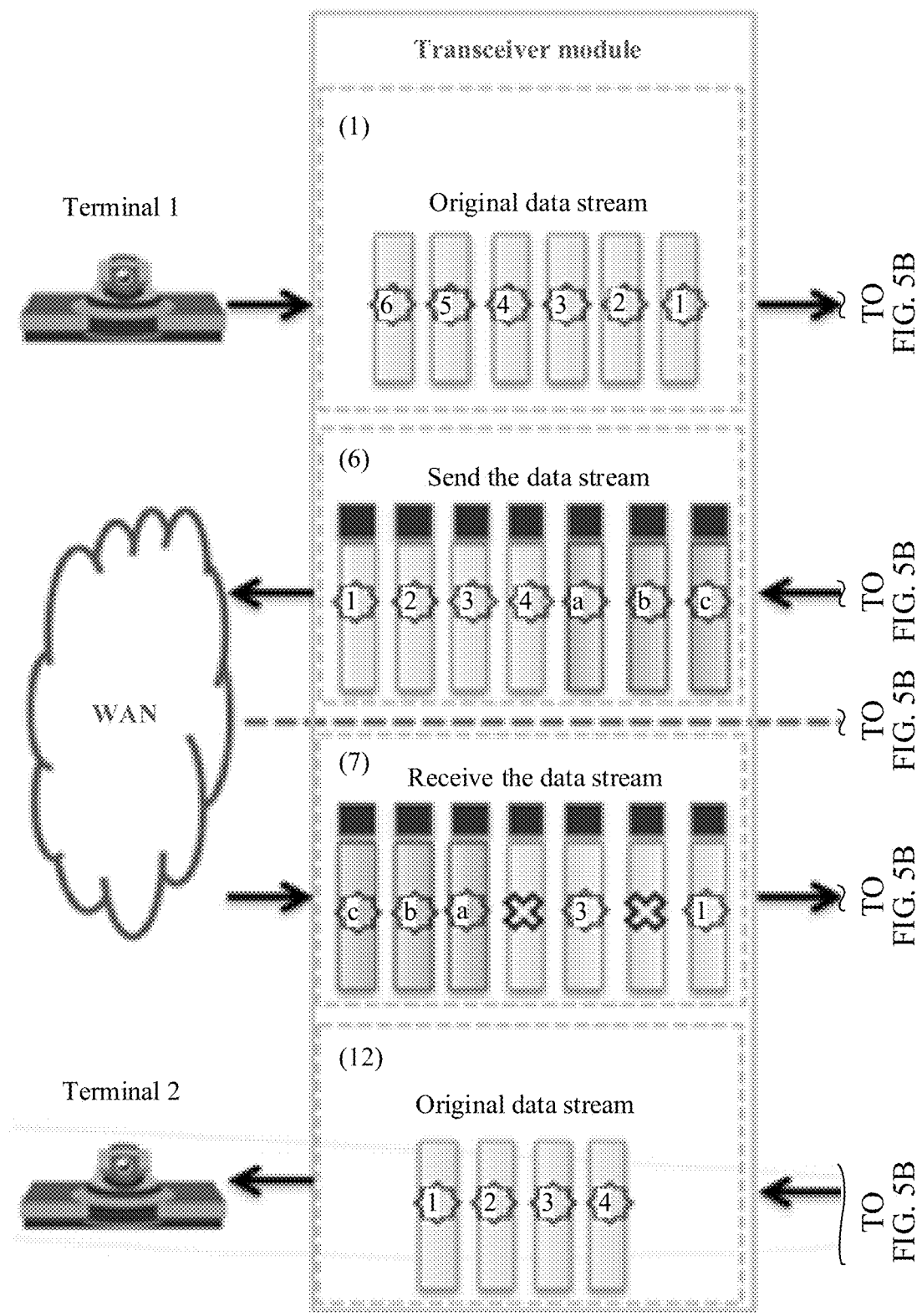
FIG. 5A to FIG. 5C are a schematic diagram of an FEC data stream transmission process according to an embodiment of this application.
Figure 5B:
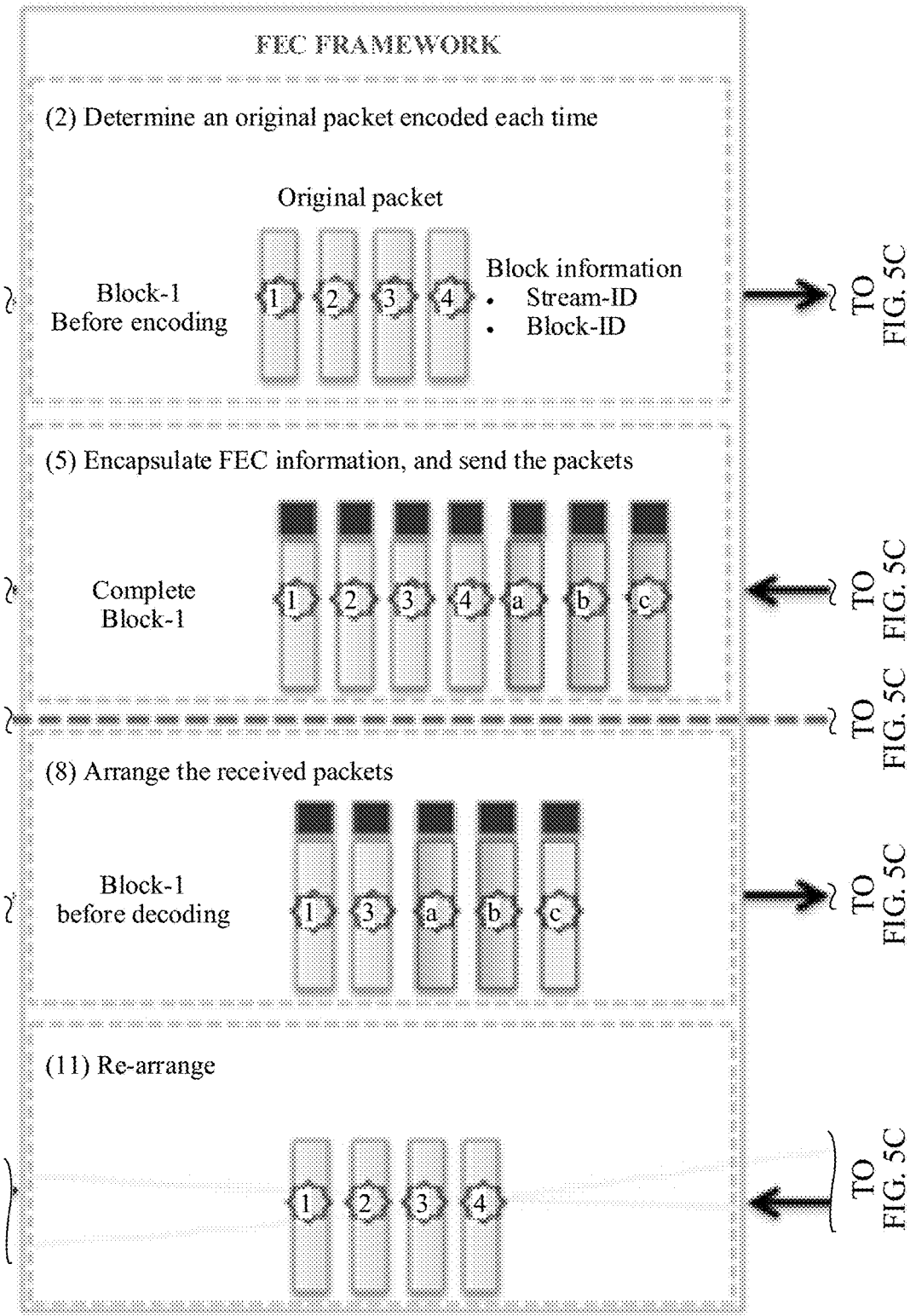
Figure 5C:
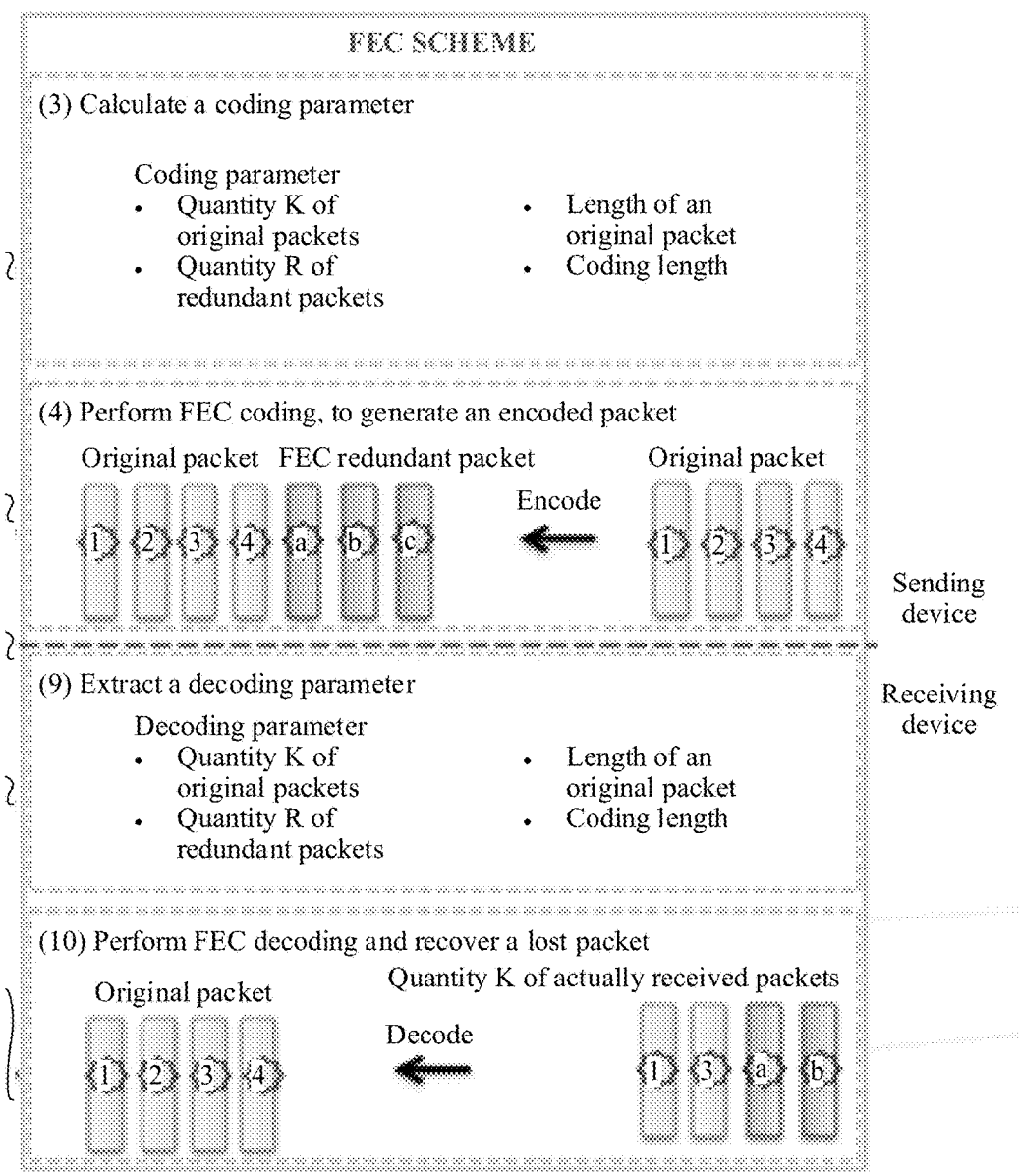

For example, as shown in FIG. 5A to FIG. 5C, an example in which the packet-loss-concealment policy is FEC is used for description. (1) The sending device obtains an original data stream, that is, original packets 1, 2, 3, 4, 5, and 6. (2) The sending device determines, according to FEC, a quantity of original packets that are encoded. A manner of determining the quantity of original packets that are encoded may include but is not limited to the following several manners: a maximum quantity of packets that is set in packet coding, a quantity of packets collected after a timeout mechanism is triggered, or a quantity of packets that is determined by using a corresponding mechanism in convolutional coding. For example, original packets that are encoded are 1, 2, 3, and 4. (3) The sending device determines coding parameters, such as a quantity K of original packets, a quantity R of redundant packets, a length of an original packet, and a coding length that are in packet coding, or corresponding coding parameters in convolutional coding. (4) The sending device performs FEC coding based on the determined coding parameters, and generates an encoded packet. According to different coding algorithms, the generated encoded packet may include newly generated redundant packets a, b, and c, or may include the original packets 1, 2, 3, and 4 or redundant packets a, b, and c. (5) The sending device encapsulates the original packets and the redundant packets to obtain a data stream 1234abc. In an embodiment, the sending device sends, by using an additional control message, information (for example, decoding parameters) required for decoding to the receiving device, so that the receiving device may decode the data stream based on the control message after receiving the data stream. In this step, the control message may include indication information and a coding parameter of a packet-loss-concealment packet, for example, a block size for the packet coding. (6) The sending device sends the data stream 1234abc to the receiving device through a WAN link, where the data stream includes an original packet and a packet-loss-concealment packet. (7) Because the WAN link is unstable, a packet loss may occur when transmitting the data stream. In this case, the receiving device may receive only 13abc in the data stream. (8) The receiving device arranges the received data stream 13abc. (9) The receiving device obtains the decoding parameters from the control message sent by the sending device, such as the quantity K of original packets, the quantity R of redundant packets, the length of an original packet, and the coding length, or corresponding coding parameters in convolutional coding. (10) The receiving device decodes the actually received data stream 13ab based on the decoding parameters, and recovers lost packets. (11) The receiving device re-arranges the recovered packets and the received original packets to obtain 1, 2, 3, and 4. (12) The receiving device sends the packets 1, 2, 3, and 4 recovered in (11) to the terminal. If the packets are audio and video packets, the terminal is facilitated in displaying the audio and video packets, thereby improving packet-loss-concealment transmission efficiency, and improving user experience.

In (4) in FIG. 5C, the sending device performs FEC coding based on the determined coding parameters, to generate an encoded packet, where the encoded packet may be a packet-loss-concealment packet. In an embodiment, the sending device generates the packet-loss-concealment packet for the data stream according to the packet-loss-concealment policy, that is, S102 in FIG. 3.

Figure 6:
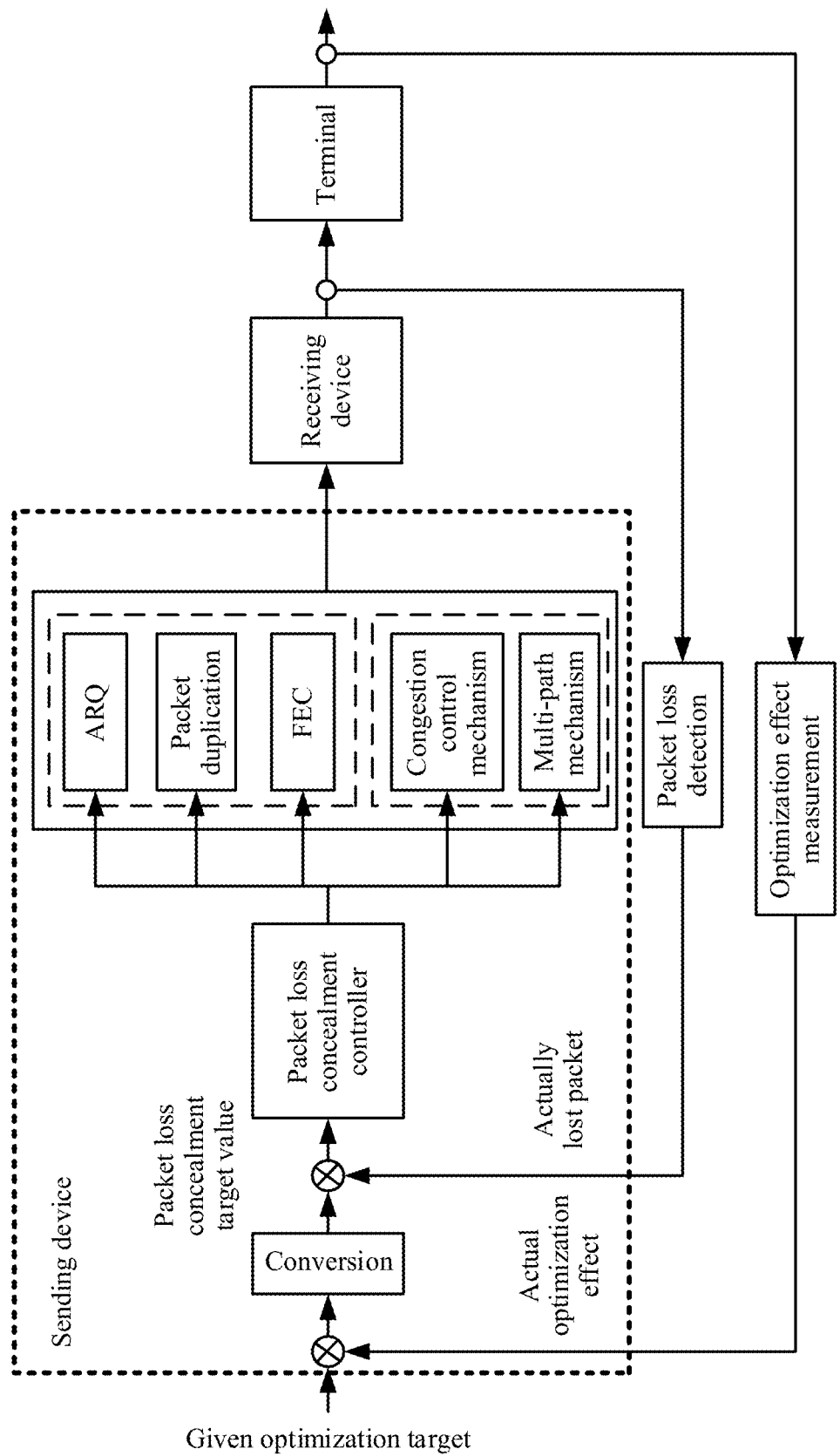
FIG. 6 is a schematic diagram of a process of generating a packet-loss-concealment packet according to an embodiment of this application.

A process in which the sending device generates the packet-loss-concealment packet for the data stream according to the packet-loss-concealment policy is shown in FIG. 6. In FIG. 6, the sending device includes a packet-loss-concealment controller. The packet-loss-concealment controller is configured to determine the path used to send the data stream, and determine the packet-loss-concealment policy based on the path used to send the data stream, so that the sending device generates the packet-loss-concealment packet for the data stream according to the packet-loss-concealment policy.

In an embodiment, the sending device obtains given optimization target information for sending the data stream. For example, if the to-be-sent data stream is a video stream of a video conference, an overall effect, such as a smooth video and no frame freezing, of the video conference needs to be ensured. The sending device generates a packet-loss-concealment target value through internal conversion. For example, a packet loss rate of the data stream in the transmission process needs to be less than 0.01%. The packet-loss-concealment controller of the sending device dynamically determines the packet-loss-concealment policy based on path status information, such as a packet loss rate, a delay, and a network jitter, of the path used to send the data stream, to generate the packet-loss-concealment packet according to the packet-loss-concealment policy.

In an embodiment, the packet-loss-concealment controller may constrain the path status information of the path based on a set constraint condition, for example, a packet loss rate threshold, a delay threshold, a network jitter threshold, an available bandwidth threshold, and another threshold, to determine the packet-loss-concealment policy. The packet-loss-concealment policy includes ARQ, packet duplication, and FEC. The sending device generates the packet-loss-concealment packet according to the packet-loss-concealment policy, and sends the data stream to the receiving device based on a path congestion control mechanism and a path selection mechanism.

The packet-loss-concealment policy is dynamically determined, and the packet-loss-concealment packet is generated according to the packet-loss-concealment policy, so that a packet-loss-concealment capability of transmitting a data stream is enhanced, and user experience is improved.

Figure 7:
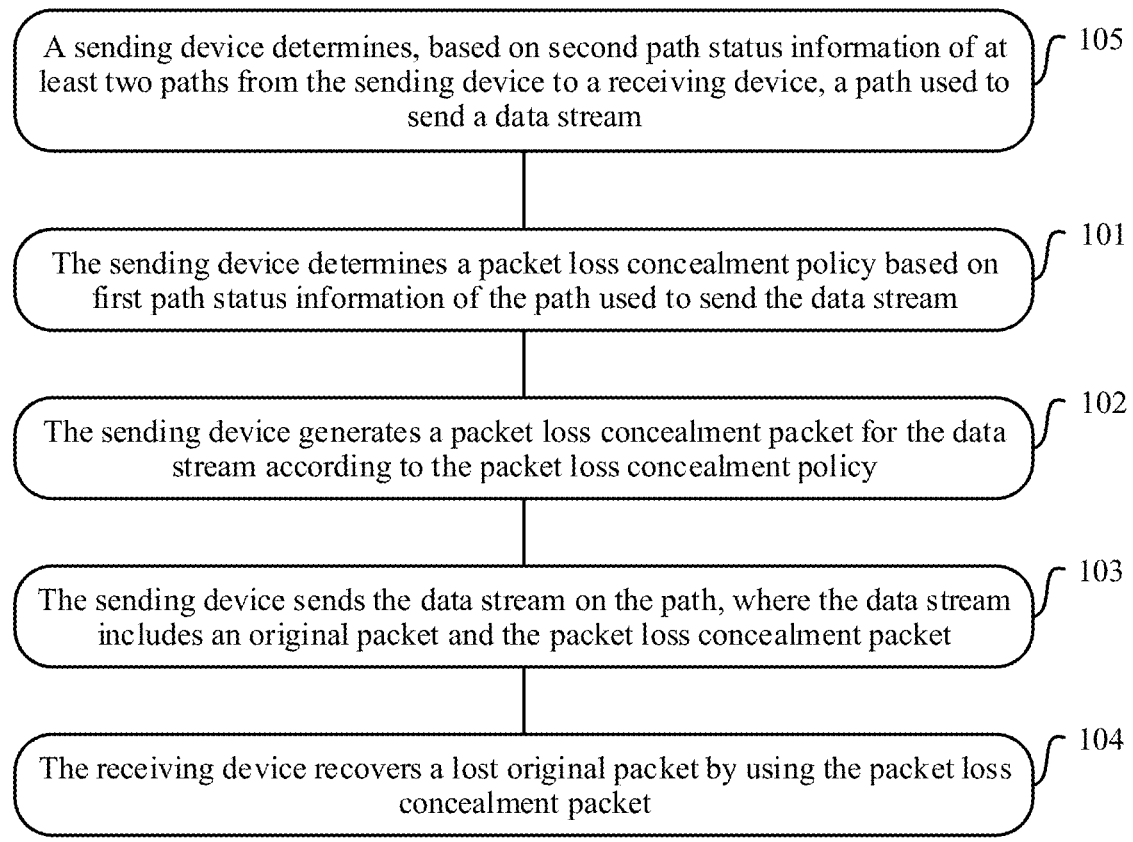
FIG. 7 is a schematic flowchart of a data stream transmission method according to an embodiment of this application.

Optionally, as shown in FIG. 7, before the packet-loss-concealment policy is determined based on the first path status information of the path used to send the data stream, that is, before S101 in the embodiment shown in FIG. 3, the method may further include the following step:

S105: The sending device determines a path for sending the data stream in at least two paths from the sending device to the receiving device.

Figure 8:
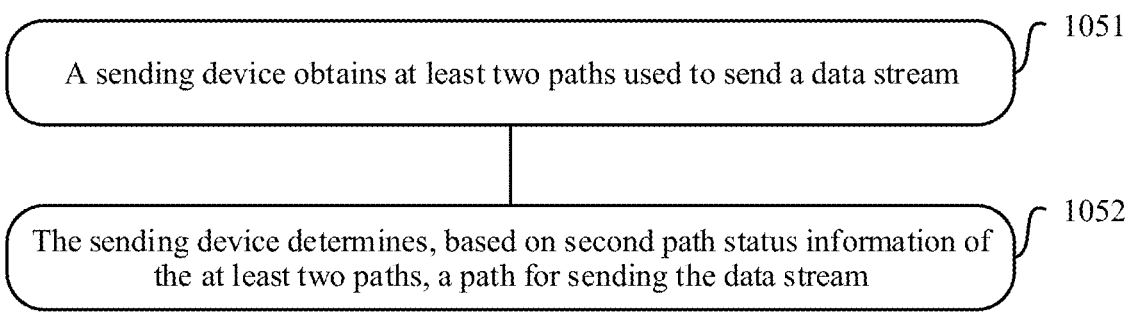
FIG. 8 is a schematic flowchart of a method for determining a path used to send a data stream according to an embodiment of this application.

In an embodiment, as shown in FIG. 8, determining the path for sending the data stream in the at least two paths from the sending device to the receiving device includes:

S1051: The sending device obtains at least two paths used to send the data stream.

In an embodiment, the sending device obtains, from the controller shown in FIG. 1, the at least two paths used to send the data stream. In other words, the controller notifies the sending device of paths used to send the data stream. Alternatively, the sending device obtains, by using information such as local tunnel status maintenance, the at least two paths used to send the data stream. The at least two paths are at least two paths from the sending device to the receiving device.

In an embodiment, when the sending device obtains, from the controller, only one path used to send the data stream, or when the sending device obtains, by using the information such as the local tunnel status maintenance, only one path used to send the data stream, the sending device uses the path to transmit the data stream.

S1052: The sending device determines, based on second path status information of the at least two paths, the path for sending the data stream.

When obtaining the two or more paths used to send the data stream, the sending device measures path status information of each path, such as a packet loss rate, a one-way delay, a two-way delay, a network jitter, and an available bandwidth of each path for transmitting the data stream, and determines, based on the path status information of each path, a path finally used to send the data stream.

In an embodiment, the sending device determines, based on packet loss rates of the at least two paths, one path, two paths, or a plurality of paths for sending the data stream.

In an embodiment, the sending device determines, based on at least one of packet loss rates, delays, network jitters, available bandwidths, and delay differences of the at least two obtained paths, one or two paths for sending the data stream.

Figure 9:
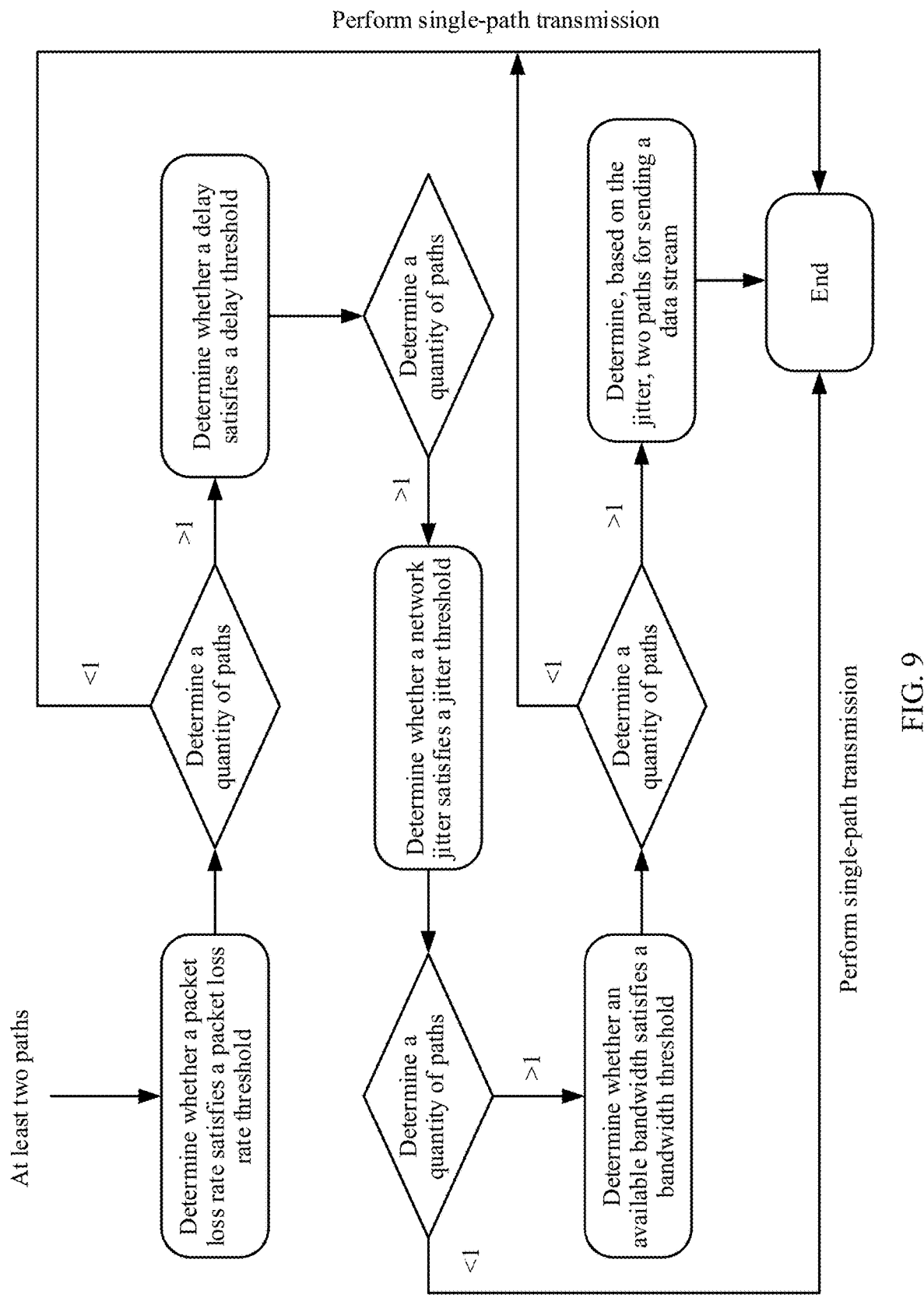
FIG. 9 is a schematic flowchart of a method for determining a path used to send a data stream according to an embodiment of this application.

For example, in an embodiment, as shown in FIG. 9, the sending device first determines whether the packet loss rate of each of the at least two paths satisfies a preset packet loss rate threshold $Loss_{threshold}$. When there is one path that satisfies the packet loss rate threshold, the sending device transmits the data stream on a single path, that is, sends the data stream on the path. When there is more than one path that satisfies the packet loss rate threshold, the sending device further determines whether a delay of the more than one path satisfies a preset delay threshold $Delay_{threshold}$. When there is one path that satisfies the delay threshold, the sending device sends the data stream on the path. When there is more than one path that satisfies the delay threshold, the sending device further determines whether a network jitter of the more than one path satisfies a preset network jitter threshold $Jitter_{threshold}$. When there is one path that satisfies the network jitter threshold, the sending device sends the data stream on the path. When there is more than one path that satisfies the network jitter threshold, the sending device may further determine, based on an available bandwidth of the more than one path, a path finally used to send the data stream. For example, the sending device determines whether the bandwidth of the more than one path satisfies a preset bandwidth threshold $Band_{threshold}$. When there is one path that satisfies the bandwidth threshold, the sending device sends the data stream on the path.

In an embodiment, when there is more than one path that satisfies the bandwidth threshold and a single path is used to send the data stream, the sending device may determine a path with a maximum available bandwidth as the path for sending the data stream.

In an embodiment, when there is more than one path that satisfies the bandwidth threshold, the sending device may determine two or more paths with relatively large bandwidths in available bandwidths as paths for sending the data stream.

Figure 10:
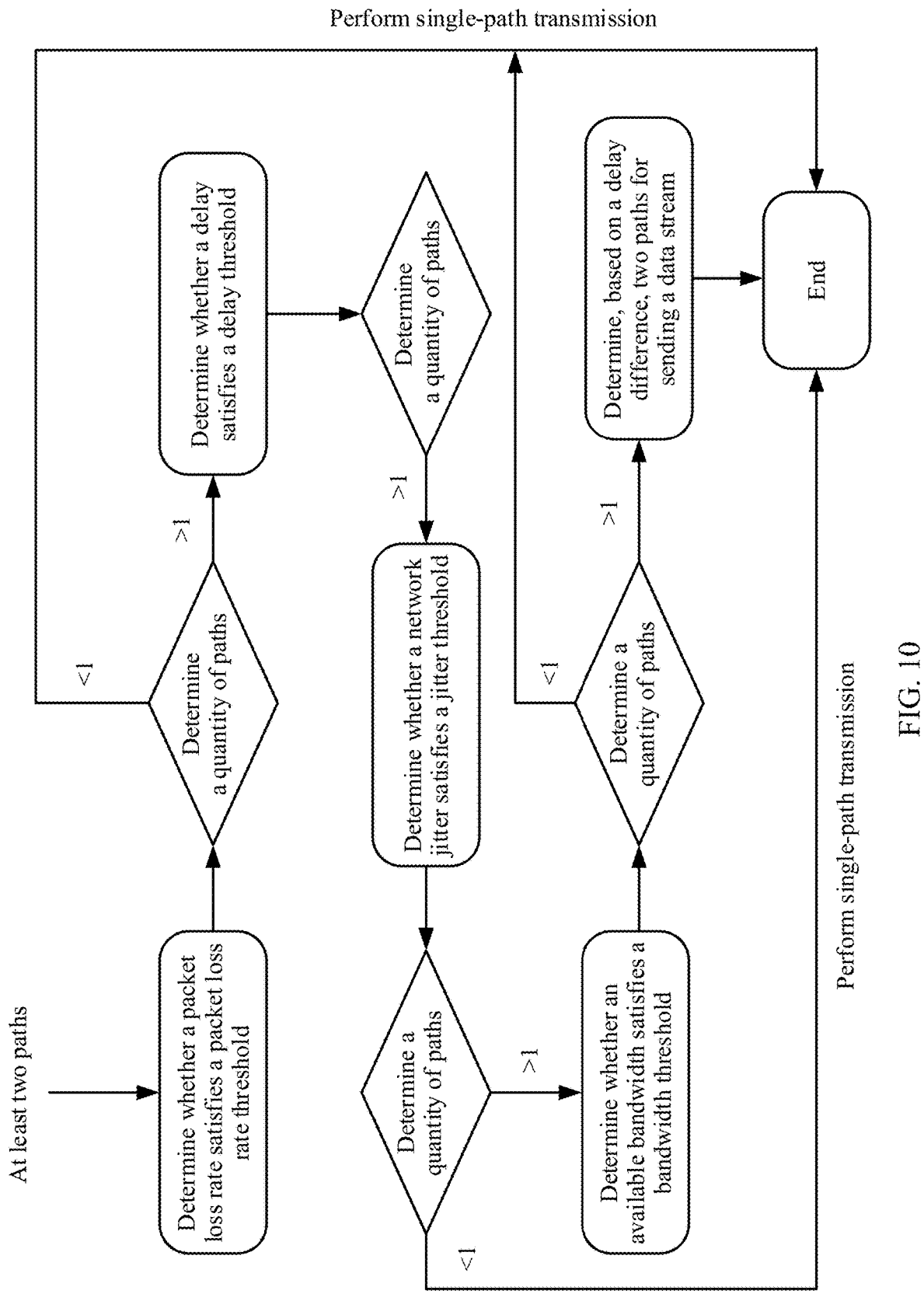
FIG. 10 is a schematic flowchart of a method for determining a path used to send a data stream according to an embodiment of this application.

In an embodiment, as shown in FIG. 10, when there is more than one path that satisfies the bandwidth threshold, the sending device may further determine, in the more than one path that satisfies the bandwidth threshold, whether a delay difference of any two paths satisfies a preset delay difference threshold $Delta\_delay_{threshold}$. When the delay difference of the two paths in the more than one path that satisfies the bandwidth threshold satisfies the delay difference threshold, the sending device determines to send the data stream on the two paths.

In an embodiment, when each of a plurality of pairs of paths in the more than one path that satisfies the bandwidth threshold has a delay difference that satisfies the delay difference threshold, the sending device determines to send the data stream on two paths with a minimum delay difference.

In an embodiment, the sending device determines to send the data stream on two paths whose delay difference is less than the preset delay difference threshold. In other words, when there are two paths used to send the data stream, a delay difference of the two paths is less than the preset delay difference threshold.

It should be noted that in the embodiments of this application, the sending device may determine, in different determining sequences of a packet loss rate of a path and at least one of a delay, a network jitter, an available bandwidth, or a delay difference of a path, the path for sending the data stream. This is not limited in the embodiments of this application.

In an embodiment, when it is finally determined that there is one path used to send the data stream, S103 in which the sending device sends the data stream on the path in FIG. 3 is specifically: The sending device sends the data stream including the original packet and the packet-loss-concealment packet on the path, so that after receiving the packet-loss-concealment packet, the receiving device recovers, based on the packet-loss-concealment packet, the packet lost in the transmission process.

In an embodiment, when the sending device determines that there is one path used to send the data stream, the sending device sends the data stream including the original packet and the packet-loss-concealment packet on the path.

Figure 11:
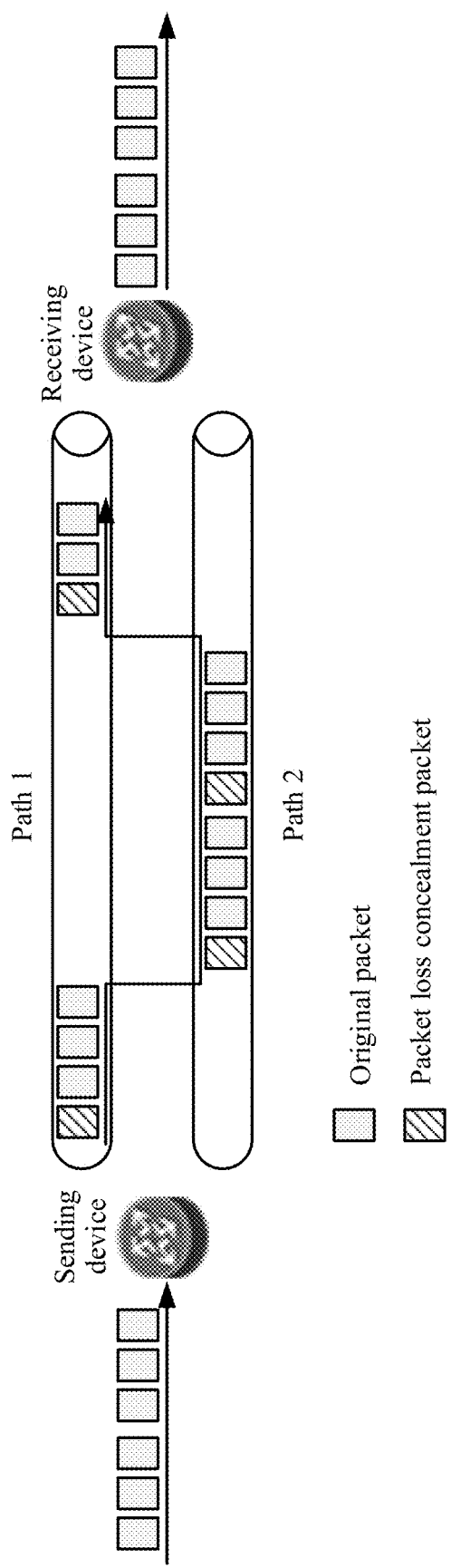
FIG. 11 is a schematic diagram of a data stream transmission process according to an embodiment of this application.

Optionally, in an embodiment, as shown in FIG. 11, the sending device dynamically determines, based on current path status information, an optimal path used to send the data stream, and sends the data stream according to different packet-loss-concealment policies. In FIG. 11, when a status of a path that is being used to send the data stream at a moment is relatively poor, the path is switched to a path whose path status is relatively good, to send the data stream.

Figure 12:
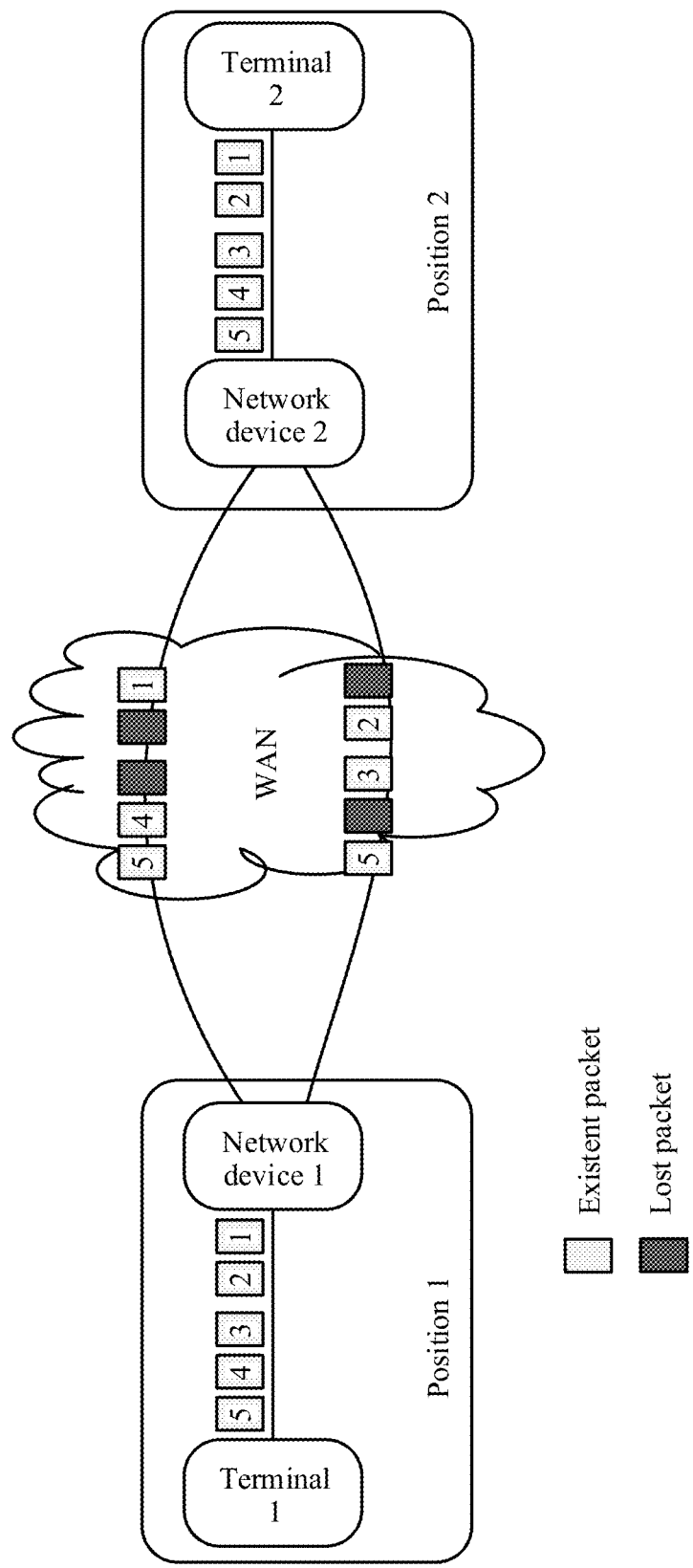
FIG. 12 is a schematic diagram of a data stream transmission process according to an embodiment of this application.

In an embodiment, when the sending device determines that there are two paths used to send the data stream, the sending device separately determines one-way delays of the two paths, and determines a delay difference of the two paths. The original packet is sent on a path with a longer delay, and the packet-loss-concealment packet is sent on a path with a shorter delay. In addition, the packet-loss-concealment packet is sent after the original packet is sent, and the original packet and the packet-loss-concealment packet are sent at a time interval t, where t is a one-way time difference for sending the data stream on the two paths, as shown in FIG. 12, so that the original packet and the packet-loss-concealment packet arrive at the receiving device at the same time.

Figure 13:
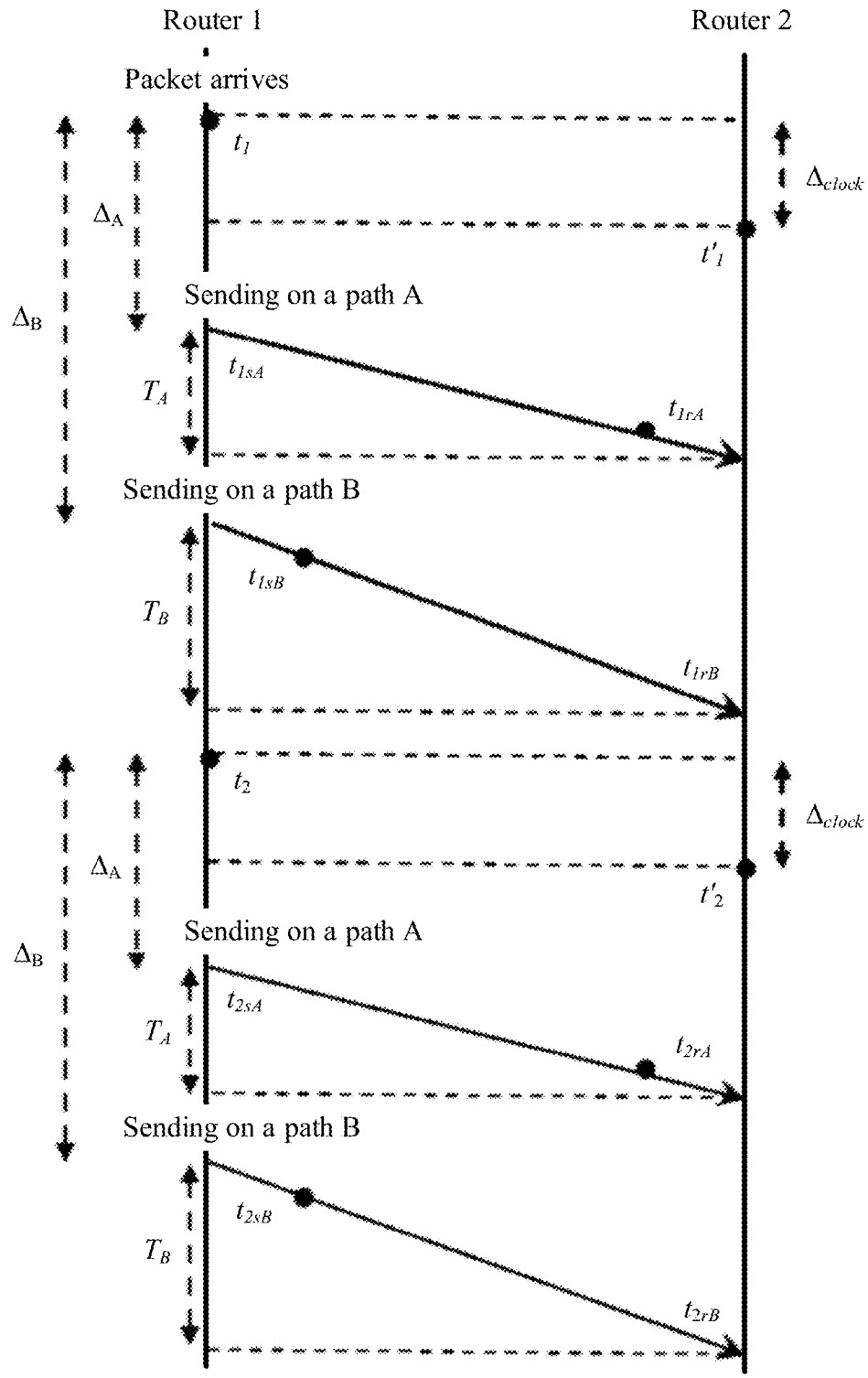
FIG. 13 is a schematic diagram of a delay difference calculation process according to an embodiment of this application.

A process of calculating the delay difference of the two paths is shown in FIG. 13. In FIG. 13, a router 1 is the sending device, and a router 2 is the receiving device. It should be noted that, in FIG. 13, recorded time points are local time points on the router 1 and the router 2. The time point on the router 1 and the time point on the router 2 are not calibrated, and the local time point on the router 1 and the local point on the router 2 may be not in correspondence. For example, a current time point is Beijing time 9:00 a.m., while a current time point on the router 1 is Beijing time 9:01 a.m. and a current time point on the router 2 is Beijing time 9:02 a.m. Meanings of notations are described as below:

$t_1$ is a local time point at which a packet 1 arrives at the router 1.

$t_1'$ is a local time point at which the packet 1 arrives at the router 2.

$t_{1sA}$ is a local time point, on the router 1, at which the packet 1 (for example, the original packet) is sent on a path A.

$t_{1rA}$ is a local time point, on the router 2, at which the packet 1 (for example, the original packet) arrives at the router 2 along the path A.

$t_{1sB}$ is a local time point, on the router 1, at which the packet 1 (for example, the packet-loss-concealment packet) is sent on a path B.

$t_{1rB}$ is a local time point, on the router 2, at which the packet 1 (for example, the packet-loss-concealment packet) arrives at the router 2 along the path B.

$\Delta_{clock}$ is a clock offset between the local time point on the router 1 and the local time point on the router 2. For example, at a current moment, if the time point on the router 1 is Beijing time 9:01 a.m. and the time point on the router 2 is Beijing time 9:01 a.m., $\Delta_{clock}$ is one minute.

$\Delta_A$ is an interval between a time point at which the router 1 receives the packet 1 and a time point at which the router 1 sends the packet 1 on the path A.

$\Delta_B$ is an interval between a time point at which the router 1 receives the packet 1 and a time point at which the router 1 sends the packet 1 on the path B.

$T_A$ is a time period of transmitting the packet 1 or a packet 2 from the router 1 to the router 2 on the path A.

$T_B$ is a time period of transmitting the packet 1 or the packet 2 from the router 1 to the router 2 on the path B.

$t_2$ is a local time point at which the packet 2 arrives at the router 1.

$t_2'$ is a local time point at which the packet 2 arrives at the router 2.

$t_{2sA}$ is a local time point, on the router 1, at which the packet 2 (for example, the original packet) is sent on the path A.

$t_{2rA}$ is a local time point, on the router 2, at which the packet 2 (for example, the original packet) arrives at the router 2 along the path A.

$t_{2sB}$ is a local time point, on the router 1, at which the packet 2 (for example, the packet-loss-concealment packet) is sent on the path B.

$t_{2rB}$ is a local time point, on the router 2, at which the packet 2 (for example, the packet-loss-concealment packet) arrives at the router 2 along the path B.

In this case, the following equations are true:

$$t_{1sA} = t_1 + \Delta_A$$

$$t_{1sB} = t_1 + \Delta_B$$

$$t_{1rA} = t_1 + \Delta_A + T_A = t_1' - \Delta_{clock} + \Delta_A + T_A$$

$$t_{1rB} = t_1 + \Delta_B + T_B = t_1' - \Delta_{clock} + \Delta_B + T_B$$

Therefore, a time difference $\Delta_{path}$ between the time point at which the packet 1 arrives at the router through the path A and the time point at which the packet 1 arrives at the router through the path B is as follows:

$$t_{1rB} - t_{1rA} = (t_1' - \Delta_{clock} + \Delta_B \pm T_B) - (t_1' - \Delta_{clock} + \Delta_A + T_A)$$

$$= (\Delta_B - \Delta_A) + (T_B - T_A)$$

$$= (\Delta_B - \Delta_A) + (A_{path})$$

When $\Delta_B = \Delta_A$, $\Delta_{path} = t_{1rB} - t_{1rA}$.

Further, a maximum jitter is $J = \max(\text{abs}\{(t_{2rx} - t_2) - (t_{1ry} - t_1)\})$, where x and y belong to $\{A, B, C, \ldots\}$, $t_{2rx}$ is a local time point, on the router 2, at which the packet 2 arrives at the router 2 along the path x, and $t_{1ry}$ is a local time point, on the router 2, at which the packet 1 arrives at the router 2 along the path y.

The maximum jitter is obtained as follows by substituting $t_{1ry} = t_1 + \Delta_A + T_A$ and $t_{2rx} = t_2 + \Delta_B + T_B$ into $J = \max(\text{abs}\{(t_{2rx} - t_2) - (t_{1ry} - t_1)\})$:

$$J = \max(\text{abs}\{T_{2x} - T_{1y} + \Delta_{2x} - \Delta_{1y}\})$$

$T_{2x}$ represents a time period of transmitting the packet 2 on the path x, and $T_{1y}$ represents a time period of transmitting the packet 1 on the path y. x and y each are a path. For example, x is the path B, and y is the path A. $\Delta_{2x}$ is a waiting time period existing before the packet 2 is sent on the path x. $\Delta_{1y}$ is a waiting time period existing before the packet 1 is sent on the path y.

In an embodiment, the router 1 does not perform delay control. When receiving a packet, the router 1 immediately sends the packet on the path A and the path B, that is, $\Delta_B = \Delta_A = 0$. Therefore, $J = \max(\text{abs}\{T_{2x} - T_{1y}\})$. In this case, the router 2 needs to resist a jitter with a fixed-size buffer.

In an embodiment, the router 1 predicts J before sending the packet, and when predicting that J is greater than a preset threshold, the router 1 sends the packet on a single path.

In an embodiment, the router 1 performs delay control, and requires that the original packet and the packet-loss-concealment packet arrive at the router 2 at the same time, that is, $\Delta_{1x} + T_{1x} = \Delta_{1y} + T_{1y}$. Therefore, $J = \max(\text{abs}\{T_{2x}\} - \max\{T_{1y}\})$.

After the router 1 performs delay control, a jitter tends to be on the single path, and this solution still needs to depend on buffering of the router 2. To be specific, that the jitter tends to be on the single path means that after a plurality of paths are added for transmission, a maximum jitter value of the data stream approaches that a minimum jitter value on a path in the plurality of selected paths. In other words, a plurality of paths do not increase a jitter value of the data stream, that is, do not cause more jitters, and therefore do not affect user experience.

Figure 14:
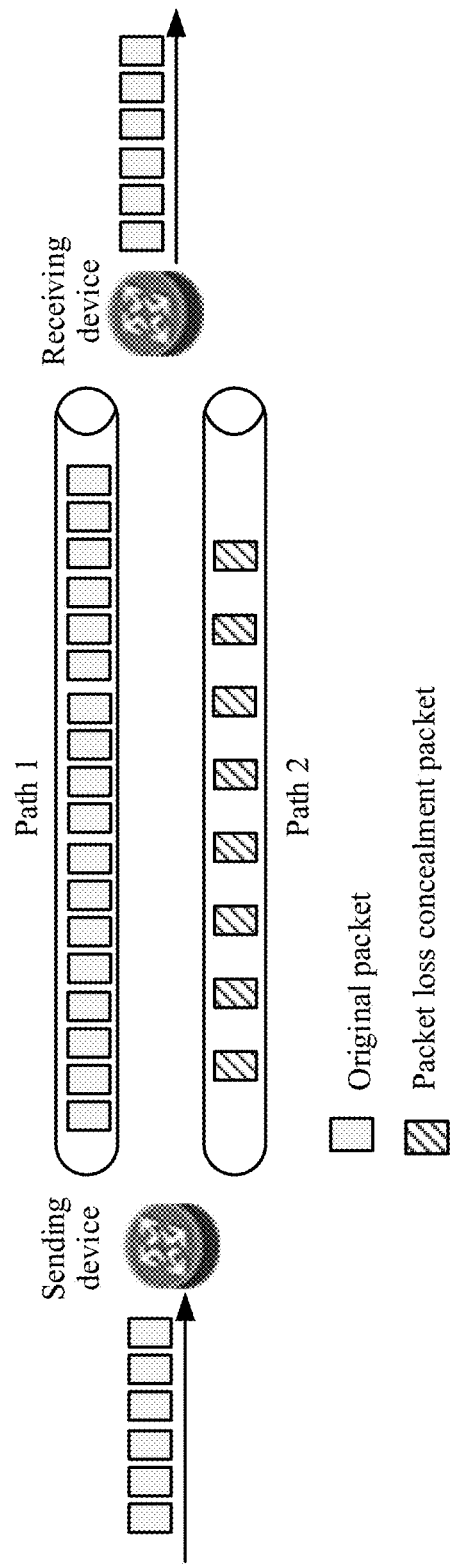
FIG. 14 is a schematic diagram of a data stream transmission process according to an embodiment of this application.

In this case, a transmission delay may increase. As shown in FIG. 14, when determining to send the data stream on two paths, the sending device separately determines delays of the two paths, and determines a time difference of the two paths. The sending device sends the original packet on a path with a longer delay. At an interval of the delay difference after the original packet is sent, the sending device sends the packet-loss-concealment packet on a path with a shorter delay, so that the original packet and the packet-loss-concealment packet arrive at the receiving device at the same time. The receiving device decodes and re-arranges the packets and forward the packets to the corresponding terminal. In addition, the receiving device performs in-band measurement. To be specific, when receiving the original packet and the packet-loss-concealment packet, the receiving device measures path statuses of the paths, and sends path status information to the sending device.

The sending device receives the path status information of the paths, and determines whether the two paths on which the data stream is currently sent still satisfy a specified threshold (including a packet loss rate, a delay, a network jitter, bandwidth, or the like). If the two paths satisfy the threshold, the sending device still sends the data stream on the two paths. If the two paths do not satisfy the threshold, the sending device sends the data stream on a selected path with better path status information. In this case, sending of the data stream on two paths switches to sending of the data stream on one path.

In a next period, if the sending device determines other two paths whose path status information satisfies the specified threshold, the sending device switches sending of the data stream on one path to sending of the data stream on two paths. The determining the path used to send the data stream by the sending device may be configured by using a command or in another manner.

In an embodiment, determining the path used to send the data stream and determining the packet-loss-concealment policy that is for the data stream may alternatively be completed by a third-party device (subsequently referred to as a control device) other than the sending device.

Figure 15:
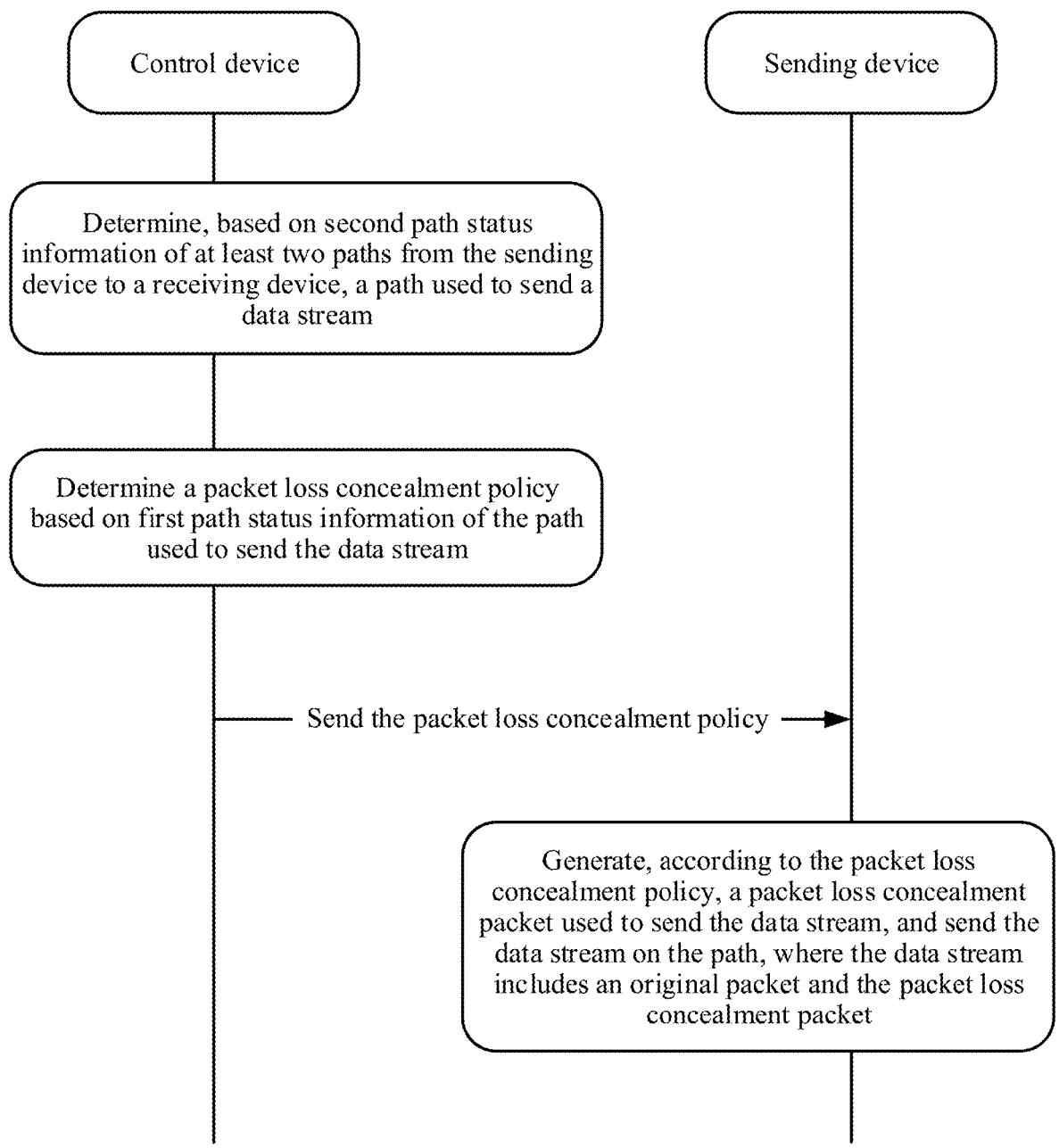
FIG. 15 is a schematic flowchart of a data stream transmission method according to an embodiment of this application.

In an embodiment, as shown in FIG. 15, a control device determines, based on path status information (also referred to as the second path status information) of the at least two paths from the sending device to the receiving device, the path used to send the data stream; the control device determines the packet-loss-concealment policy based on the first path status information of the path used to send the data stream; and the control device sends the determined packet-loss-concealment policy to the sending device. In other words, before the sending device sends the data stream, the sending device obtains the packet-loss-concealment policy from the control device, so that the sending device generates the packet-loss-concealment packet according to the packet-loss-concealment policy, thereby completing sending of the data stream.

Optionally, in an embodiment, the second path status information includes a packet loss rate.

Optionally, in an embodiment, the second path status information further includes at least one of a delay, a network jitter, a bandwidth, and a delay difference.

Optionally, in an embodiment, there is one path, or two paths, used to send the data stream.

Optionally, in an embodiment, when there are two paths used to send the data stream, a delay difference of the paths used to send the data stream is less than a delay difference threshold.

Optionally, in an embodiment, in a fifth possible implementation of the third aspect, that the control device determines the packet-loss-concealment policy based on the first path status information of the path used to send the data stream includes:

The control device determines the packet-loss-concealment policy based on at least one of the first path status information of the path used to send the data stream, the packet-loss-concealment target value of the data stream, or the traffic rate of the data stream, where the packet-loss-concealment target value includes the packet loss rate upper limit for transmitting the data stream, to ensure that a packet loss rate obtained after packet loss recovery is performed on the data stream by using the determined packet-loss-concealment policy is less than the packet loss rate upper limit.

Processes in which the control device determines the path used to send the data stream and in which the control device determines the packet-loss-concealment policy that is for the data stream are the same as the processes in which the sending device determines the path used to send the data stream and in which the sending device determines the packet-loss-concealment policy that is for the data stream. For brevity of description, details are not described herein again.

Figure 16:
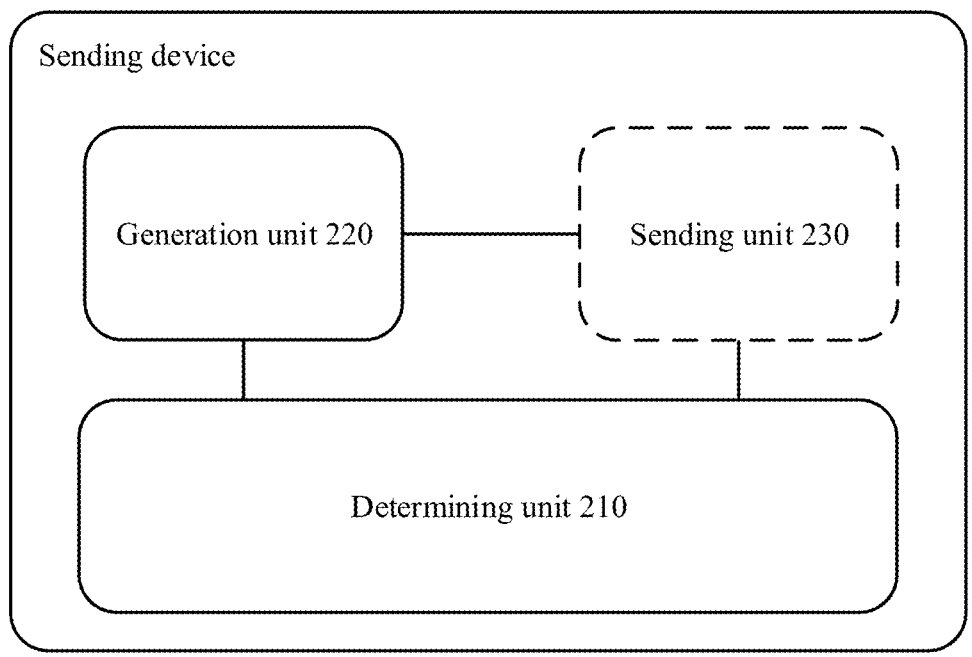
FIG. 16 is a schematic structural diagram of a sending device according to an embodiment of this application.

An embodiment of this application provides a data stream transmission device. The transmission device is a sending device. As shown in FIG. 16, the sending device includes a determining unit 210, a generation unit 220, and a sending unit 230.

The determining unit 210 is configured to determine a packet-loss-concealment policy based on first path status information of a path used to send a data stream.

The generation unit 220 is configured to generate a packet-loss-concealment packet for the data stream according to the packet-loss-concealment policy.

The sending unit 230 is configured to send the data stream on the path. The data stream includes an original packet and the packet-loss-concealment packet. Therefore, when receiving the data stream, a receiving device decodes the data stream according to the packet-loss-concealment policy received from the sending device, and recovers, by using the packet-loss-concealment packet, an original packet lost in a transmission process. This effectively improves a packet loss recovery effect, and improves user experience.

In an embodiment, the determining unit 210 is further configured to determine, based on second path status information of at least two paths from the sending device to the receiving device, the path used to send the data stream.

In an embodiment, the second path status information includes a packet loss rate. Optionally, in an embodiment, the second path status information further includes at least one of a delay, a network jitter, a bandwidth, and a delay difference.

Optionally, in an embodiment, there is one path, or two paths, used to send the data stream.

In an embodiment, when there are two paths used to send the data stream, a delay difference of the paths used to send the data stream is less than a delay difference threshold.

Optionally, in an embodiment, that the determining unit 210 determines the packet-loss-concealment policy based on the first path status information of the path used to send the data stream includes:

The determining unit 210 determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

In an embodiment, the first path status information includes at least one of the delay or the packet loss rate.

Optionally, in an embodiment, the packet-loss-concealment policy includes at least one of automatic repeat request ARQ, packet duplication, and forward error correction FEC.

In an embodiment, when the packet-loss-concealment policy is forward error correction FEC, the packet-loss-concealment packet is a redundant packet. That the generation unit 220 generates the packet-loss-concealment packet for the data stream according to the packet-loss-concealment policy includes:

The determining unit 210 determines an FEC coding scheme, where the coding scheme includes block coding or convolutional coding.

The generation unit 220 encodes the original packet based on the determined coding scheme, to generate a redundant packet.

Optionally, in an embodiment, the sending unit 230 is further configured to send a packet-loss-concealment control message to the receiving device, where the packet-loss-concealment control message includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

Optionally, in an embodiment, the indication information is further used to indicate an identifier of the data stream and an identifier of the path used to send the data stream.

Optionally, in an embodiment, the packet-loss-concealment message further includes a coding parameter of the packet-loss-concealment packet. When the packet-loss-concealment policy is FEC, the coding parameter includes block coding or convolutional coding used for encoding.

Optionally, in an embodiment, the packet-loss-concealment packet includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

Optionally, in an embodiment, the indication information is further used to indicate an identifier of the path used to send the data stream.

In an embodiment, the indication information is carried in an extension field of the packet-loss-concealment packet.

Optionally, in an embodiment, the packet-loss-concealment packet further includes a coding parameter of the packet-loss-concealment packet. When the packet-loss-concealment policy is FEC, the coding parameter includes block coding or convolutional coding used for encoding.

Optionally, in an embodiment, when the data stream is sent on two paths, that the sending unit sends the data stream on the path includes:

sending the original packet on a path with a longer delay in the two paths; and sending the packet-loss-concealment packet on a path with a shorter delay in the two paths, where the packet-loss-concealment packet is sent after the original packet is sent, the original packet and the packet-loss-concealment packet are sent at a time interval t, and t is a one-way delay difference of sending the data stream on the two paths.

Functions of the function units of the sending device may be implemented by using the steps performed by the sending device in the embodiments shown in FIG. 3 and FIG. 7. Therefore, a specific working process of the device provided in this embodiment of this application is not described herein again.

Figure 17:
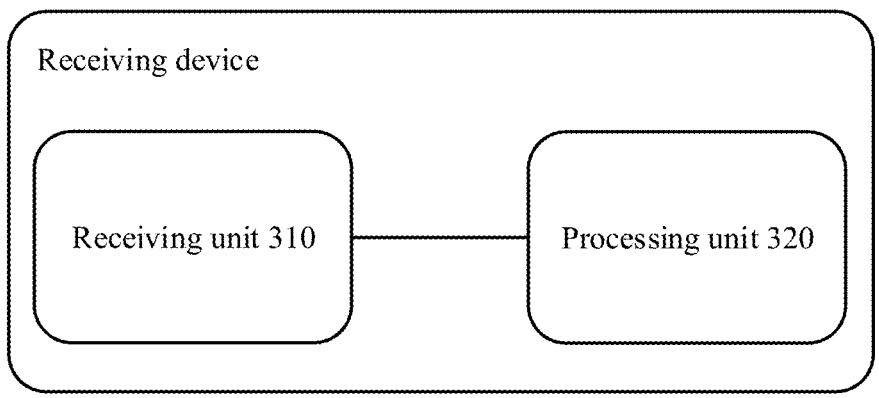
FIG. 17 is a schematic structural diagram of a receiving device according to an embodiment of this application.

An embodiment of this application provides a data stream transmission device. The device is a receiving device. As shown in FIG. 17, the receiving device includes a receiving unit 310 and a processing unit 320.

The receiving unit 310 is configured to receive an original packet and a packet-loss-concealment packet that are of a data stream and that are sent by a sending device, where the packet-loss-concealment packet is generated according to a packet-loss-concealment policy.

The processing unit 320 is configured to recover a lost original packet by using the packet-loss-concealment packet, that is, recover, by using the packet-loss-concealment packet, the original packet lost in a transmission process. This effectively improves a packet loss recovery effect, and improves user experience.

Optionally, in an embodiment, the receiving unit 310 is further configured to receive a packet-loss-concealment control message, where the packet-loss-concealment control message includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

In an embodiment, the indication information is further used to indicate an identifier of the data stream and an identifier of the path used to send the data stream.

Optionally, in an embodiment, the packet-loss-concealment message further includes a coding parameter of the packet-loss-concealment packet. When the packet-loss-concealment policy is FEC, the coding parameter includes block coding or convolutional coding used for encoding.

Optionally, in an embodiment, the packet-loss-concealment packet includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

In an embodiment, the indication information is further used to indicate an identifier of the path used to send the data stream.

Optionally, in an embodiment, the indication information is carried in an extension field of the packet-loss-concealment packet.

Optionally, in an embodiment, the packet-loss-concealment packet further includes a coding parameter of the packet-loss-concealment packet. When the packet-loss-concealment policy is FEC, the coding parameter includes block coding or convolutional coding used for encoding.

Functions of the function units of the receiving device may be implemented by using the steps performed by the receiving device in the embodiments shown in FIG. 3 and FIG. 7. Therefore, a specific working process of the device provided in this embodiment of this application is not described herein again.

Figure 18:
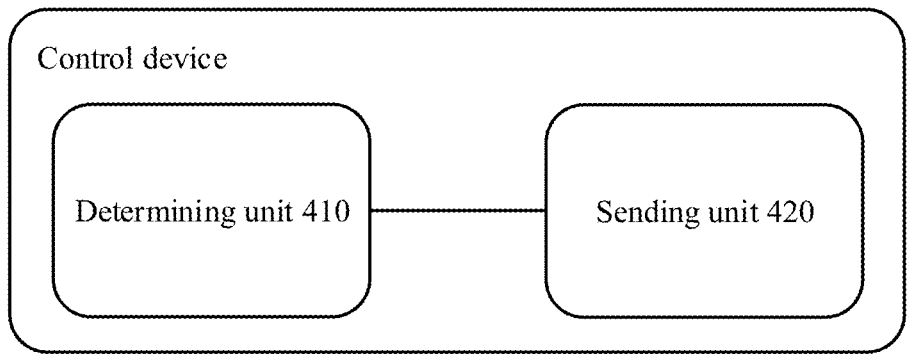
FIG. 18 is a schematic structural diagram of a control device according to an embodiment of this application.

An embodiment of this application provides a data stream transmission device. The transmission device is a control device. As shown in FIG. 18, the control device is configured to determine a path used to send a data stream and a packet-loss-concealment policy that is for the data stream. The control device includes a determining unit 410 and a sending unit 420.

The determining unit 410 is configured to determine a packet-loss-concealment policy based on first path status information of a path used to send a data stream.

The sending unit 420 is configured to send the packet-loss-concealment policy to a sending device, where the packet-loss-concealment policy is used by the sending device to generate a packet-loss-concealment packet for the data stream and send the data stream on the path. The data stream includes an original packet and the packet-loss-concealment packet. Therefore, when receiving the data stream, a receiving device decodes the data stream according to the packet-loss-concealment policy received from the sending device, and recovers, by using the packet-loss-concealment packet, an original packet lost in a transmission process. This effectively improves a packet loss recovery effect, and improves user experience.

In an embodiment, the determining unit 410 is further configured to determine, based on second path status information of at least two paths from the sending device to the receiving device, the path used to send the data stream.

In an embodiment, the second path status information includes a packet loss rate.

Optionally, in an embodiment, the second path status information further includes at least one of a delay, a network jitter, a bandwidth, and a delay difference.

Optionally, in an embodiment, there is one path, or two paths, used to send the data stream.

In an embodiment, when there are two paths used to send the data stream, a delay difference of the paths used to send the data stream is less than a delay difference threshold.

That the determining unit 410 determines the packet-loss-concealment policy based on the first path status information of the path used to send the data stream includes:

The determining unit 410 determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

Optionally, in an embodiment, the first path status information includes at least one of the delay or the packet loss rate.

Optionally, in an embodiment, the packet-loss-concealment policy includes at least one of automatic repeat request ARQ, packet duplication, and forward error correction FEC.

Functions of the function units of the control device may be implemented by using the steps performed by the control device in the embodiments shown in FIG. 15. Therefore, a specific working process of the device provided in this embodiment of this application is not described herein again.

Figure 19:
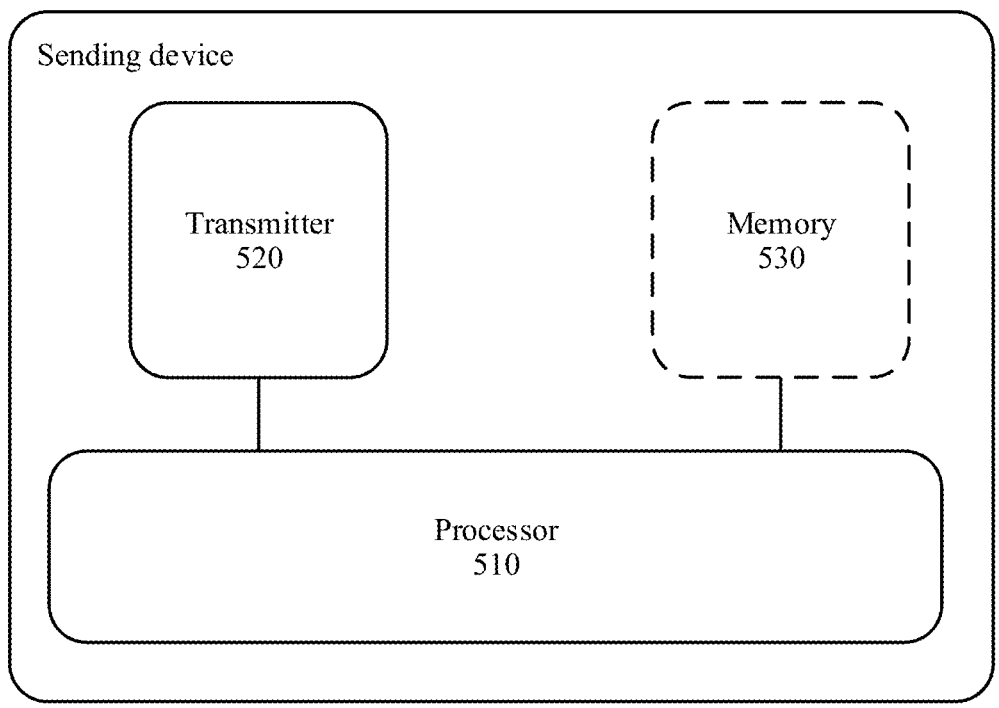
FIG. 19 is a schematic structural diagram of a sending device according to an embodiment of this application.

An embodiment of this application further provides a data stream transmission device. The transmission device is a sending device. As shown in FIG. 19, the sending device includes a processor 510 and a transmitter 520.

The processor 510 is configured to: determine a packet-loss-concealment policy based on first path status information of a path used to send a data stream; and generate a packet-loss-concealment packet for the data stream according to the packet-loss-concealment policy.

The transmitter 520 is configured to send the data stream on the path. The data stream includes an original packet and the packet-loss-concealment packet. Therefore, when receiving the data stream, a receiving device decodes the data stream according to the packet-loss-concealment policy received from the sending device, and recovers, by using the packet-loss-concealment packet, an original packet lost in a transmission process. This effectively improves a packet loss recovery effect, and improves user experience.

In an embodiment, the processor 510 is further configured to determine, based on second path status information of at least two paths from the sending device to the receiving device, the path used to send the data stream.

In an embodiment, the second path status information includes a packet loss rate.

Optionally, in an embodiment, the second path status information further includes at least one of a delay, a network jitter, a bandwidth, and a delay difference.

Optionally, in an embodiment, there is one path, or two paths, used to send the data stream.

In an embodiment, when there are two paths used to send the data stream, a delay difference of the paths used to send the data stream is less than a delay difference threshold.

In an embodiment, that the processor 510 determines the packet-loss-concealment policy based on the first path status information of the path used to send the data stream includes:

The processor 510 determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

Optionally, in an embodiment, the first path status information includes at least one of the delay or the packet loss rate.

Optionally, in an embodiment, the packet-loss-concealment policy includes at least one of automatic repeat request ARQ, packet duplication, and forward error correction FEC.

Optionally, in an embodiment, when the packet-loss-concealment policy is forward error correction FEC, the packet-loss-concealment packet is a redundant packet. That the processor 510 generates the packet-loss-concealment packet for the data stream according to the packet-loss-concealment policy includes:

The processor 510 determines an FEC coding scheme, where the coding scheme includes block coding or convolutional coding.

The processor 510 encodes the original packet based on the determined coding scheme, to generate a redundant packet.

Optionally, in an embodiment, the transmitter 520 is further configured to send a packet-loss-concealment control message to the receiving device, where the packet-loss-concealment control message includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

In an embodiment, the indication information is further used to indicate an identifier of the data stream and an identifier of the path used to send the data stream.

Optionally, in an embodiment, the packet-loss-concealment message further includes a coding parameter of the packet-loss-concealment packet. When the packet-loss-concealment policy is FEC, the coding parameter includes block coding or convolutional coding used for encoding.

Optionally, in an embodiment, the packet-loss-concealment packet includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

In an embodiment, the indication information is further used to indicate an identifier of the path used to send the data stream.

Optionally, in an embodiment, the indication information is carried in an extension field of the packet-loss-concealment packet.

Optionally, in an embodiment, the packet-loss-concealment packet further includes a coding parameter of the packet-loss-concealment packet. When the packet-loss-concealment policy is FEC, the coding parameter includes block coding or convolutional coding used for encoding.

Optionally, in an embodiment, when the data stream is sent on two paths, that the transmitter sends the data stream on the path includes:

sending the original packet on a path with a longer delay in the two paths; and sending the packet-loss-concealment packet on a path with a shorter delay in the two paths, where the packet-loss-concealment packet is sent after the original packet is sent, the original packet and the packet-loss-concealment packet are sent at a time interval t, and t is a one-way delay difference of sending the data stream on the two paths.

Optionally, in an embodiment, the control device further includes a memory 530, configured to store instructions and data, for example, the packet-loss-concealment policy.

Functions of the function components of the sending device may be implemented by using the steps performed by the sending device in the embodiments shown in FIG. 3 and FIG. 7. Therefore, a specific working process of the device provided in this embodiment of this application is not described herein again.

Figure 20:
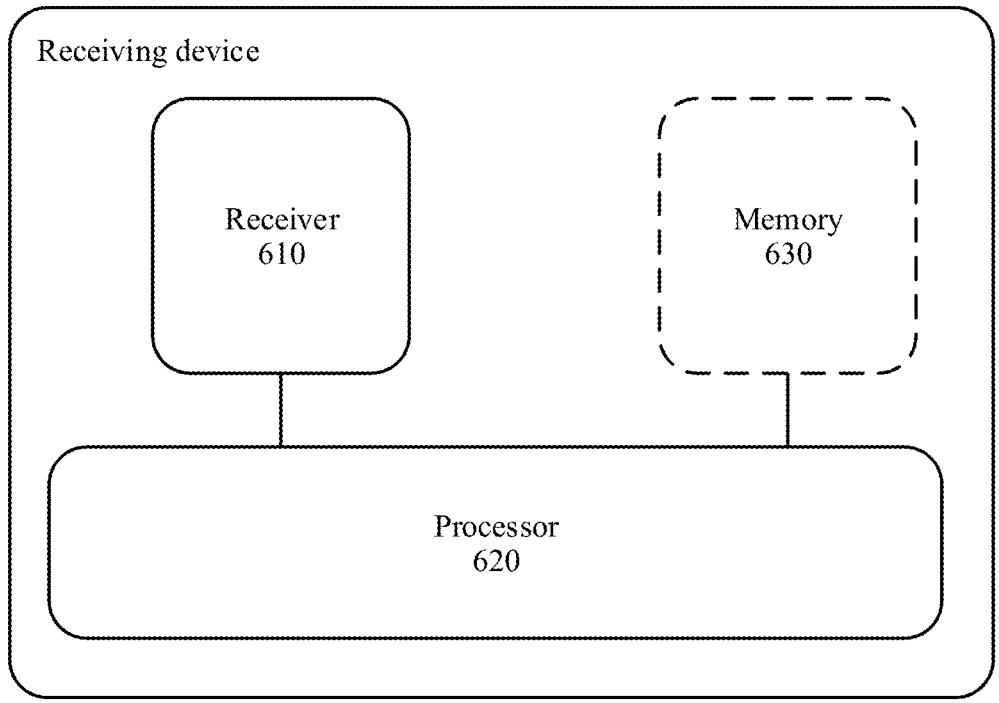
FIG. 20 is a schematic structural diagram of a receiving device according to an embodiment of this application.

An embodiment of this application further provides a data stream transmission device. The transmission device is a receiving device. As shown in FIG. 20, the receiving device includes a receiver 610 and a processor 620.

The receiver 610 is configured to receive an original packet and a packet-loss-concealment packet that are of a data stream and that are sent by a sending device, where the packet-loss-concealment packet is generated according to a packet-loss-concealment policy.

The processor 620 is configured to recover a lost original packet by using the packet-loss-concealment packet, that is, recover, by using the packet-loss-concealment packet, the original packet lost in a transmission process. This effectively improves a packet loss recovery effect, and improves user experience.

In an embodiment, the receiver 610 is further configured to receive a packet-loss-concealment control message, where the packet-loss-concealment control message includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

In an embodiment, the indication information is further used to indicate an identifier of the data stream and an identifier of the path used to send the data stream.

Optionally, in an embodiment, the packet-loss-concealment message further includes a coding parameter of the packet-loss-concealment packet. When the packet-loss-concealment policy is FEC, the coding parameter includes block coding or convolutional coding used for encoding.

Optionally, in an embodiment, the packet-loss-concealment packet includes indication information, and the indication information is used to indicate the packet-loss-concealment policy that is for the data stream. Therefore, when receiving the packet-loss-concealment policy, the receiving device decodes the packet-loss-concealment packet in the data stream according to the packet-loss-concealment policy, and recovers, by using the packet-loss-concealment packet, an original packet lost in the transmission process of the data stream. In this way, when a path status is relatively poor, the lost original packet is recovered by using the packet-loss-concealment packet generated based on the dynamically determined packet-loss-concealment policy, reducing a packet loss in the transmission process of the data stream, and improving user experience.

In an embodiment, the indication information is further used to indicate an identifier of the path used to send the data stream.

Optionally, in an embodiment, the indication information is carried in an extension field of the packet-loss-concealment packet.

Optionally, in an embodiment, the packet-loss-concealment packet further includes a coding parameter of the packet-loss-concealment packet. When the packet-loss-concealment policy is FEC, the coding parameter includes block coding or convolutional coding used for encoding.

Optionally, in an embodiment, the control device further includes a memory 630, configured to store instructions and data, for example, the original packet and the packet-loss-concealment packet.

Functions of the function components of the receiving device may be implemented by using the steps performed by the receiving device in the embodiments shown in FIG. 3 and FIG. 7. Therefore, a specific working process of the device provided in this embodiment of this application is not described herein again.

Figure 21:
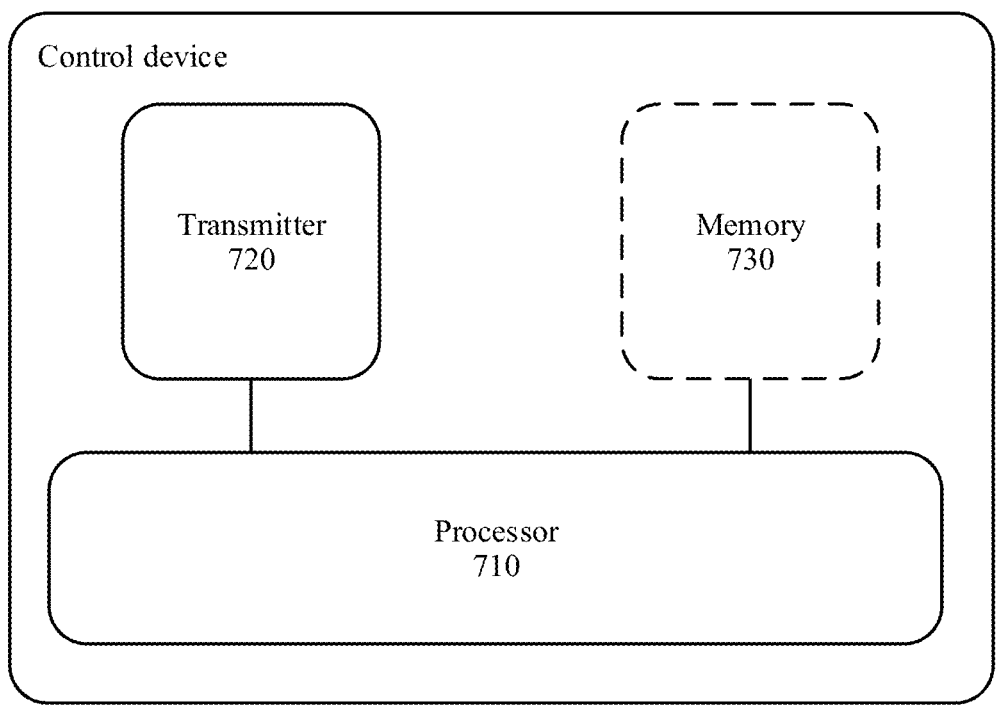
FIG. 21 is a schematic structural diagram of a control device according to an embodiment of this application.

An embodiment of this application further provides a data stream transmission device. The transmission device is a control device. As shown in FIG. 21, the control device includes a processor 710 and a transmitter 720.

The processor 710 is configured to determine a packet-loss-concealment policy based on first path status information of a path used to send a data stream.

The transmitter 720 is configured to send the packet-loss-concealment policy to a sending device, where the packet-loss-concealment policy is used by the sending device to generate a packet-loss-concealment packet for the data stream and send the data stream on the path. The data stream includes an original packet and the packet-loss-concealment packet. Therefore, when receiving the data stream, a receiving device decodes the data stream according to the packet-loss-concealment policy received from the sending device, and recovers, by using the packet-loss-concealment packet, an original packet lost in a transmission process. This effectively improves a packet loss recovery effect, and improves user experience.

In an embodiment, the processor 710 is further configured to determine, based on second path status information of at least two paths from the sending device to the receiving device, the path used to send the data stream.

In an embodiment, the second path status information includes a packet loss rate.

Optionally, in an embodiment, the second path status information further includes at least one of a delay, a network jitter, a bandwidth, and a delay difference.

Optionally, in an embodiment, there is one path, or two paths, used to send the data stream.

In an embodiment, when there are two paths used to send the data stream, a delay difference of the paths used to send the data stream is less than a delay difference threshold.

Optionally, in an embodiment, that the processor 710 determines the packet-loss-concealment policy based on the first path status information of the path used to send the data stream includes:

The processor 710 determines the packet-loss-concealment policy based on at least one of the first path status information of the path used to send the data stream, a packet-loss-concealment target value of the data stream, or a traffic rate of the data stream, where the packet-loss-concealment target value includes a packet loss rate upper limit for transmitting the data stream, to ensure that a packet loss rate obtained after packet loss recovery is performed on the data stream by using the determined packet-loss-concealment policy is less than the packet loss rate upper limit.

Optionally, in an embodiment, the first path status information includes at least one of the delay or the packet loss rate.

Optionally, in an embodiment, the packet-loss-concealment policy includes at least one of automatic repeat request ARQ, packet duplication, and forward error correction FEC.

Optionally, in an embodiment, the control device further includes a memory 730, configured to store instructions and data, for example, the packet-loss-concealment policy.

Functions of the function components of the control device may be implemented by using the steps performed by the control device in the embodiments shown in FIG. 15. Therefore, a specific working process of the device provided in this embodiment of this application is not described herein again.

An embodiment of this application provides a computer program product including instructions. When the instructions are run on a computer, the method/steps in FIG. 3, FIG. 7, or FIG. 15 is/are performed.

An embodiment of this application provides a computer-readable storage medium, configured to store instructions. When the instructions are executed on a computer, the method/steps in FIG. 3, FIG. 7, or FIG. 15 is/are performed.

All or some of the foregoing embodiments of this application may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable medium to another computer-readable medium. For example, the computer instructions may be transmitted from a website, a computer, a server, or a data center in a wired (for example, coaxial cable, optical fiber, digital subscriber line (Digital Subscriber Line, DSL)) manner or a wireless (for example, infrared, radio, or microwave) manner to another website, computer, server, or data center. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconducting medium (for example, a solid state disk (Solid State Disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus for data stream transmission, comprising:
   at least one processor;
   one or more memories coupled to the at least one processor and storing instructions for execution by the at least one processor, wherein the at least one processor is configured to execute the instructions to cause the apparatus to:
   determine a packet-loss-concealment policy based on first path status information of a path in two paths used to send a data stream;
   generate a packet-loss-concealment packet associated with an original packet for the data stream according to the packet-loss-concealment policy, wherein the data stream comprises the original packet and the packet-loss-concealment packet associated with the original packet;
   send the original packet on a path with a longer delay in the two paths; and
   send the packet-loss-concealment packet associated with the original packet on a path with a shorter delay in the two paths, wherein the packet-loss-concealment packet is sent after the original packet is sent, the original packet and the packet-loss-concealment packet are sent at a time interval t, and t is a one-way delay difference of sending the data stream on the two paths.

2. The apparatus according to claim 1, wherein before the packet-loss-concealment policy is determined based on the first path status information of the path used to send the data stream, the apparatus is further caused to:
   determine, based on second path status information of at least two paths from a sending device to a receiving device, the path used to send the data stream.

3. The apparatus according to claim 2, wherein the second path status information comprises a packet loss rate.

4. The apparatus according to claim 3, wherein the second path status information further comprises at least one of a delay, a network jitter, a bandwidth, or a delay difference.

5. The apparatus according to claim 1, wherein when two paths are used to send the data stream, a delay difference of the two paths used to send the data stream is less than a delay difference threshold.

6. The apparatus according to claim 1, wherein the apparatus is further caused to:
   determine the packet-loss-concealment policy based on at least one of the first path status information of the path used to send the data stream, a packet-loss-concealment target value of the data stream, or a traffic rate of the data stream, wherein the packet-loss-concealment target value comprises a packet loss rate upper limit for transmitting the data stream.

7. The apparatus according to claim 1, wherein the first path status information comprises at least one of the delay or the packet loss rate.

8. The apparatus according to claim 1, wherein the packet-loss-concealment policy comprises at least one of automatic repeat request (ARQ), packet duplication, or forward error correction (FEC).

9. The apparatus according to claim 1, wherein when the packet-loss-concealment policy is forward error correction (FEC), the packet-loss-concealment packet is a redundant packet; and wherein the apparatus is further caused to:
determine an FEC coding scheme, wherein the coding scheme comprises block coding or convolutional coding; and
encode the original packet based on the determined coding scheme, to generate the redundant packet.

10. The apparatus according to claim 1, wherein the apparatus is further caused to:
send a packet-loss-concealment control message to the receiving device, wherein the packet-loss-concealment control message comprises indication information, and the indication information is used to indicate the packet-loss-concealment policy that is for the data stream.

11. The apparatus according to claim 10, wherein the indication information is further used to indicate an identifier of the data stream and an identifier of the path used to send the data stream.

12. The apparatus according to claim 1, wherein the packet-loss-concealment packet comprises indication information, and the indication information is used to indicate the packet-loss-concealment policy that is for the data stream.

13. The apparatus according to claim 12, wherein the indication information is further used to indicate an identifier of the path used to send the data stream.

14. The apparatus according to claim 12, wherein the indication information is carried in an extension field of the packet-loss-concealment packet.

15. An apparatus for data stream transmission, comprising:
at least one processor;
one or more memories coupled to the at least one processor and storing instructions, wherein the at least one processor is configured to execute the instructions to cause the apparatus to:
receive an original packet and a packet-loss-concealment packet of a data stream in two paths from a sending device, wherein the original packet is received on a path with a longer delay in the two paths, and the packet-loss-concealment packet associated with the original packet is received on a path with a shorter delay in the two paths, wherein the packet-loss-concealment packet is generated according to a packet-loss-concealment policy, and wherein the packet-loss-concealment packet is sent after the original packet is sent, the original packet and the packet-loss-concealment packet are sent at a time interval t, and t is a one-way delay difference of sending the data stream on the two paths; and
recover a lost original packet by using the packet-loss-concealment packet.

16. The apparatus according to claim 15, wherein the packet-loss-concealment packet comprises indication information, and wherein the indication information is used to indicate the packet-loss-concealment policy that is for the data stream and an identifier of the path used to send the data stream.

17. A network system, comprises:
a first data stream transmission apparatus that comprises:
at least one processor;
one or more memories coupled to the at least one processor and storing instructions, wherein the at least one processor is configured to execute the instructions to cause the first data stream transmission apparatus to:
determine a packet-loss-concealment policy based on first path status information of a path in two paths used to send a data stream;
generate a packet-loss-concealment packet associated with an original packet for the data stream according to the packet-loss-concealment policy, wherein the data stream comprises the original packet and the packet-loss-concealment packet associated with the original packet; and
send the original packet on a path with a longer delay in the two paths; and
send the packet-loss-concealment packet associated with the original packet on a path with a shorter delay in the two paths, wherein the packet-loss-concealment packet is sent after the original packet is sent, the original packet and the packet-loss-concealment packet are sent at a time interval t, and t is a one-way delay difference of sending the data stream on the two paths; and
a second data stream transmission apparatus that comprises:
one or more second memories coupled to the at least one second processor and storing second instructions, wherein the at least one second processor is configured to execute the second instructions to cause the second data stream transmission apparatus to:
receive the original packet and the packet-loss-concealment packet that are sent by the first data stream transmission apparatus; and
recover a lost original packet by using the packet-loss-concealment packet.

* * * * *